(12) United States Patent
Sandberg et al.

(10) Patent No.: US 9,803,711 B2
(45) Date of Patent: Oct. 31, 2017

(54) DISK BRAKE AND PRODUCTION METHOD FOR A DISK BRAKE

(71) Applicants: Stefan Sandberg, Lomma (SE); Hans Welin, Sankt Ibb (SE)

(72) Inventors: Stefan Sandberg, Lomma (SE); Hans Welin, Sankt Ibb (SE)

(73) Assignee: Haldex Brake Products AB (SE)

( * ) Notice: Subject to any disclaimer, the term of this patent is extended or adjusted under 35 U.S.C. 154(b) by 373 days.

(21) Appl. No.: 14/281,059

(22) Filed: May 19, 2014

(65) Prior Publication Data

US 2014/0250662 A1  Sep. 11, 2014

Related U.S. Application Data

(60) Division of application No. 13/619,260, filed on Sep. 14, 2012, which is a continuation of application No. PCT/EP2011/001209, filed on Mar. 11, 2011.

(30) Foreign Application Priority Data

Mar. 17, 2010 (DE) .......................... 10 2010 011 725

(51) Int. Cl.
*F16D 55/02* (2006.01)
*F16D 65/00* (2006.01)
(Continued)

(52) U.S. Cl.
CPC .......... *F16D 65/567* (2013.01); *F16D 55/227* (2013.01); *F16D 65/0043* (2013.01);
(Continued)

(58) Field of Classification Search
CPC ...... F16D 55/227; F16D 65/567; F16D 65/18; F16D 65/0043; F16D 2121/14;
(Continued)

(56) References Cited

U.S. PATENT DOCUMENTS 4,246,985 A * 1/1981 Shimizu .................. F16D 65/18
188/196 D
4,319,669 A * 3/1982 Watanabe ............. F16D 55/224
188/196 BA
(Continued)

FOREIGN PATENT DOCUMENTS

DE  202008006779 U1  7/2008
DE  202008013446 U1  4/2009
(Continued)

*Primary Examiner* — Melody Burch
(74) *Attorney, Agent, or Firm* — St. Onge Steward Johnston and Reens LLC

(57) ABSTRACT

A method for manufacturing a disc brake, the disc brake having a brake caliper and a brake actuation mechanism being supported in it, in which the brake actuation mechanism includes an amplification mechanism for introducing a clamping force, an adjustment device for compensation of lining wear with a torque clutch, a thrust element for transmitting the clamping force onto a brake disc and a reset device, which components are arranged around a rod, in which the torque clutch is formed as a roller-ramp-mechanism. A spring force can act onto the torque clutch by means of the reset device thereby forming a torque limit.

45 Claims, 23 Drawing Sheets

(51) Int. Cl.
*F16D 65/56* (2006.01)
*F16D 55/227* (2006.01)
*F16D 65/18* (2006.01)
*F16D 66/02* (2006.01)
*F16D 121/14* (2012.01)
*F16D 125/28* (2012.01)

(52) U.S. Cl.
CPC ........... *F16D 65/18* (2013.01); *F16D 66/026* (2013.01); *F16D 2121/14* (2013.01); *F16D 2125/28* (2013.01); *F16D 2250/0084* (2013.01); *Y10T 29/49826* (2015.01); *Y10T 29/49863* (2015.01)

(58) Field of Classification Search
CPC ............ F16D 2123/00; F16D 2125/28; F16D 2125/36; F16D 2250/0084; Y10T 29/49826
USPC ......... 188/71.7, 71.8, 71.9, 72.1, 72.8, 72.9, 188/79.51, 73.1, 1.11 R
See application file for complete search history.

(56) References Cited

U.S. PATENT DOCUMENTS

| | | | | |
|---|---|---|---|---|
| 5,123,505 | A | * | 6/1992 | Antony ................. F16D 65/567 188/196 D |
| 5,219,047 | A | * | 6/1993 | Fouilleux ............ F16D 65/0979 188/106 F |
| 5,788,022 | A | * | 8/1998 | Antony ................... F16D 65/18 188/196 D |
| 2013/0008749 | A1 | * | 1/2013 | Sandberg .............. F16D 55/227 188/71.8 |

FOREIGN PATENT DOCUMENTS

| | | |
|---|---|---|
| DE | 202009003262 U1 | 5/2009 |
| EP | 0271864 B1 | 4/1992 |
| EP | 0553105 B1 | 11/1994 |
| EP | 0698749 A2 | 2/1996 |
| EP | 1832777 B1 | 7/2008 |
| WO | 9207202 A1 | 4/1992 |
| WO | 0175324 A1 | 10/2001 |
| WO | 2004027281 A2 | 4/2004 |
| WO | 2004059187 A1 | 7/2004 |

* cited by examiner

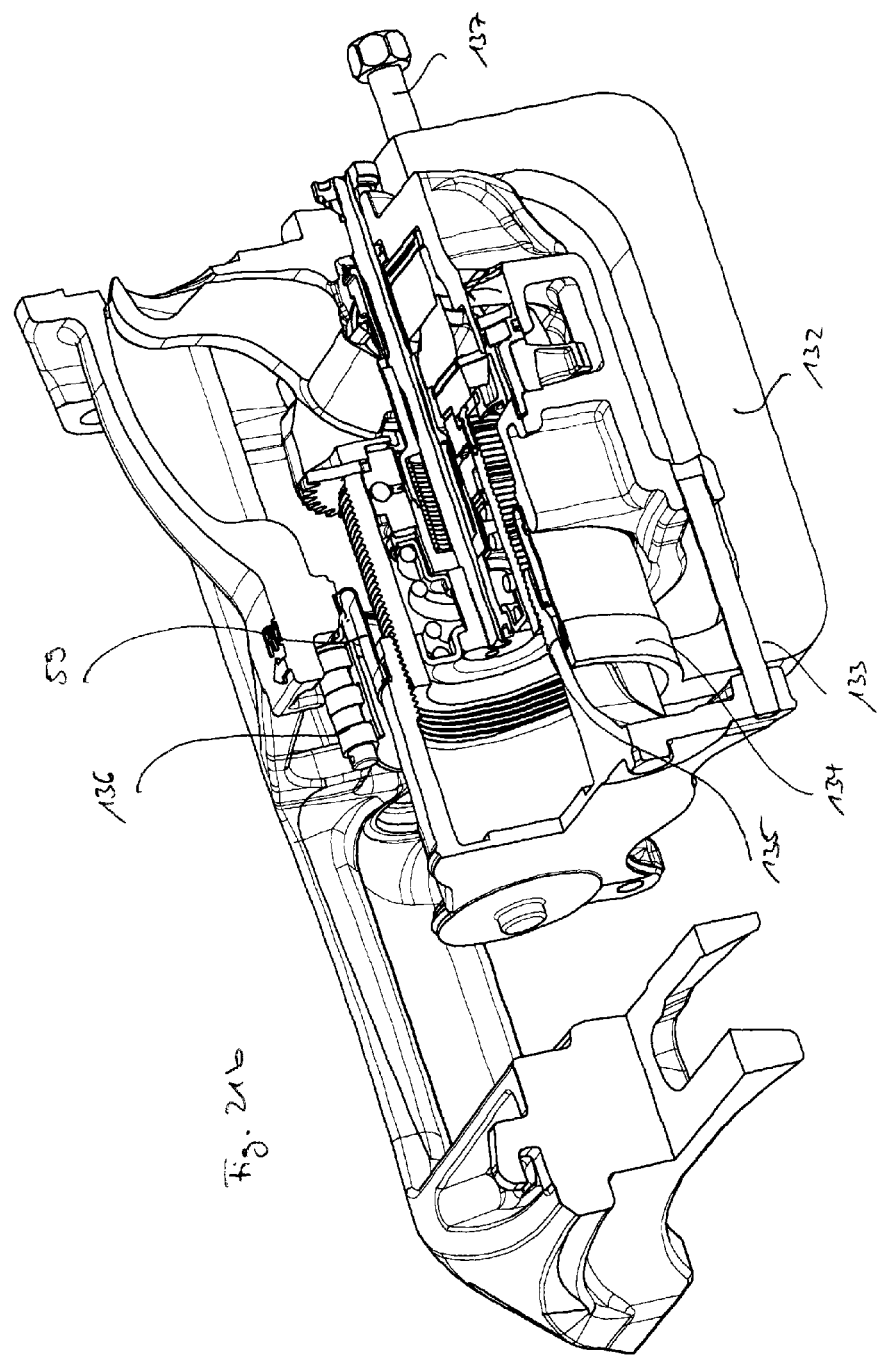

DISK BRAKE AND PRODUCTION METHOD FOR A DISK BRAKE

FIELD OF THE INVENTION

The present invention relates to a disc brake, in particular for an utility vehicle, and to a method for manufacturing and assembly, respectively, of such a disc brake.

In this connection the invention shall include disc brakes which either comprise a sliding caliper or a fixed caliper, which overlap one or more brake discs. Mainly but not exclusively the invention relates to disc brakes with lining sections.

BACKGROUND OF THE INVENTION

Disc brakes, in particular for heavy load trucks, are known with different configurations, both with respect to the type of the actuation mechanism, with respect to the way of the transmission of the braking force onto one or several brake discs and with respect to the type of the adjustment for compensating the brake lining wear.

For example, from EP 0 271 864 B1 an actuation device is known in which an axial actuation member is supported in a housing of the brake caliper, around which axial actuation member several components of the brake mechanism are arranged. The adjustment device provided for that and the force amplification mechanism in the form of a roller-ramp-mechanism to be used therewith comprise a plurality of single components which render the assembly process to be complicated and thus expensive. Moreover, in connection with the assembly the brake caliper to be employed in such a disc brake has to be provided with plenty of openings, both on the rear side of the housing of the brake caliper and on the side facing the brake disc, which, however, are associated with major sealing problems.

Furthermore, from EP 0 553 105 B1 a brake mechanism is known which embodies a lever mechanism for transmitting the clamping force. Indeed, this brake mechanism is less complex than the one as mentioned above, however, its assembly in the housing of the brake caliper proves to be cumbersome and thus time-consuming, since during the assembly inside of the housing a rotatable connection between a thrust piece and the lever by means of a roller element to be arranged between these components has to be developed and maintained. Moreover, the brake mechanism as realized in such a way can be inserted via the rear side of the brake caliper only, which necessitates a relatively large opening in the rear section of the housing of the brake caliper or even a two-piece caliper comprising a joint gap, whereby necessarily major sealing problems do occur. In addition, in consequence of the exclusive rotatable connection between the lever and the thrust piece the latter attaches to the brake pad by a slight inclination due to the lack of an additional degree of freedom, which from a kinematic point of view would additionally be required, whereby uneven wear occurs at the brake lining.

In order to avoid this problem as mentioned, it has been suggested in the prior art, e.g. in EP 0 698 749 B1, to provide such an additional degree of freedom for a lever-actuated brake mechanism so that a strict axial linear guidance of the thrust piece in direction towards the brake disc is enabled for the purpose of planar attachment of the brake lining. During the assembly the brake mechanism as disclosed in this reference is inserted with its single components both from the side of the brake disc and from the side of the brake caliper opposite to it and assembled in its interior, whereby, in turn, several openings have to be provided which cause sealing problems. Moreover, such assembly proves to be cumbersome and thus expensive as well.

From WO 01/75324 A1 a brake mechanism is known, in which the thrust element for transferring the clamping force is arranged around a central rod. However, a plurality of single components has to be employed for the configuration of the brake mechanism as shown therein, which several components have to interact in a complicated way. The brake mechanism employs a cross bar or yoke which occupies substantial space inside the brake caliper, whereby the brake mechanism as a whole comprises a large weight and, all in all, is rather bulky. Accordingly, the assembly of such a brake mechanism proves to be cumbersome.

In order to address the above-mentioned problems and disadvantages associated with disc brakes according to the mentioned prior art, WO 2004/059187 A1 of the applicant suggests to develop an actuation mechanism in the form of one single axial tappet and thrust element, respectively, which acts onto the brake disc, in which an adjustment device is already integrated in the area of the tappet. The tappet thereby is mounted in the housing of the brake caliper in parallel to the rotary axis of the brake disc by means of a rod. According to a preferred embodiment the tappet directly cooperates with a return mechanism for the thrust element, which is integrated in the tappet and which cooperates with the rod.

Independent from the actuation mechanism to be employed in this connection, as it, for example, will still be explained in connection with WO 2004/027281 A1 in the following, a compensation of the clearance between the brake disc and the brake lining at the brake pad, which results from the wear at the brake lining, has always to be provided. The brake actuation mechanism according to this example of a tappet as mentioned herein at least comprises a thrust element which transmits the clamping force onto the brake disc by means of the brake pads. For that purpose the thrust element comprises at least one rotatable element which interacts with a further element, so that both elements can be axially displaced in relation to each other, in which the latter element is guided in the brake caliper in a non-rotatable manner, however axially displaceable. For realizing this principle, it is provided according to WO 2004/059187 A1 that two sleeve-like spindles are in a threaded engagement, in which an external sleeve having an internal thread receives an internal sleeve having an external thread in a rotational manner. The external sleeve or outer spindle is supported in the brake caliper or in its carrier in a non-rotatable way, so that rotation of the internal sleeve or inner spindle results in a linear displacement of the outer spindle in relation thereto, so that the outer spindle can be moved towards the brake disc or away from it in order to compensate the wear-induced clearance at the brake linings.

For example, the non-rotatable linear guidance of the outer spindle in axial direction can be realized in that the outer spindle is connected either directly or by means of further intermediate elements with the brake lining or the brake lining retainer, which in turn itself are guided in the brake caliper or in the caliper carrier in a linear manner. In other words, due to the fact that the brake pad (brake lining and lining retainer), the lining retainer or the brake lining themselves are guided in the caliper or its carrier in axial direction relative to the brake disc without being rotatable, also the outer spindle being connected with these brake components is exclusively axially and non-rotatably guided. Thereby the connection between the outer spindle and the brake lining or its retainer, if applicable by means of a thrust plate or similar, is usually formed in a loose manner in order to enable a simple pad change, as this e.g. is suggested by EP 1 832 777 B1.

From the prior art as mentioned there is the need to eliminate the different problems and drawbacks associated therewith, preferably at the same time.

SUMMARY OF THE INVENTION

Thus, it is an object of the present invention to provide a brake mechanism which gets by with less components as compared to the prior art and which comprises a less complex structure. Associated therewith there shall be less required space and less weight. Moreover, the brake mechanism shall be characterized by an improved stability and shall enable an improved sealing due to its assembly inside the brake caliper housing.

A still further object can be seen in the provision of a brake mechanism which is easy to assemble and the single components of which can be manufactured in an easy and cost-effective manner.

These objects, respectively, are solved by a disc brake as well as by a method for manufacturing such a disc brake according to claims.

With all its embodiments the invention refers to a disc brake which comprises a brake caliper, preferably a sliding caliper, which overlaps at least one brake disc, and which further comprises a brake actuation mechanism having an amplification or enforcement mechanism for introducing a clamping force, an adjustment device for compensating wear of the brake linings, the adjustment device comprising a torque clutch, a thrust element for transmitting the clamping force onto the brake disc and a reset device, in which the amplification mechanism, the adjustment device, the thrust element and the reset device are mounted in the brake caliper in a functional interacting manner by means of a rod, which is supported in axial direction in the housing of the brake caliper.

In particular the rod serves to also mount the single brake components in the housing of the brake caliper in such a way that these components do act in parallel to the rotational axis of the brake disc.

According to the invention the rod can be configured such that it will be fixed in the housing of the brake caliper to be non-movably, i.e. non-rotatably supported. Its configuration and dimensioning are selected so that either the single brake components as different module units or the brake actuation mechanism as a whole will be supported on the rod and thereby in the housing of the brake caliper on the one hand and fixed in the rear housing section of the brake caliper facing away from the brake disc on the other hand as self-supporting units, respectively.

In case of a sliding caliper brake the brake caliper is axially slideably arranged relative to a corresponding axle of the vehicle by means of a carrier being fixed to that axle, in which the carrier comprises at least two guide pins. However, also three or four guide pins can be provided so that the sliding caliper is restricted with its position in all other directions, however, not with respect to the intended sliding direction which corresponds to the actuating direction.

The sliding caliper rests and slides on the guide pins by means of wear-resistant bearing elements which are provided in the housing of the brake caliper. For the purpose of reducing noise on the one hand and for the purpose of avoiding supporting and guiding problems on the other hand, which can be caused due to manufacturing tolerances, the bearing elements can be resiliently supported in the brake caliper. Thereby the space which surrounds the bearing surfaces will be sealed by flexible rubber bellows, end caps, closure caps or similar, so that dirt and water cannot enter, whereby otherwise the friction resistance would be increased. In the event of using end or closure caps these are preferably provided with an air ventilation mechanism for pressure compensation as this has been described in the German Utility Model no. 20 2009 003 262 of the applicant, to which disclosure it is explicitly referred herewith.

However, alternatively it is also possible that the guide pins are fixed to the brake caliper, whereas the resilient slide bearing elements are arranged at the carrier of the caliper correspondingly. In both cases slide bearing elements can preferably be used as described in the German Utility Model no. 20 2008 006 779 of the applicant, to which disclosure it is explicitly referred herewith.

The brake linings are displaceably arranged at the carrier in a known way and for that purpose will be inserted through a corresponding opening at the upper side of the caliper. The positioning and fixation of the brake linings can be realized by means of corresponding brackets and lining retainer springs having locking devices, as these, for example, are described in the German Utility Model no. 20 2008 013 446 of the applicant, to which disclosure it is explicitly referred herewith as well.

Preferably, the brake caliper is manufactured as one single piece and includes a housing section for receiving the brake actuation mechanism and further brake components and a bridge section which overlaps the brake disc and the brake linings. However, alternatively it is also possible that the housing section and the bridge section are made as two separate components which are held together by means of bolts or similar connecting means.

The housing section comprises two larger main openings. A rear main opening serves for the introduction of a force-inserting element of a pneumatic, hydraulic or electro-mechanical actuator being arranged outside of the brake caliper. The other main opening opens towards the side of the brake disc and serves for the reception of a brake actuation mechanism as well as for the passage of a thrust element of said brake actuation mechanism during brake actuation. Furthermore, several smaller auxiliary openings can be provided in the brake caliper which are required for the purpose of manufacture and assembly, for the attachment and application of a rewinding device for the adjustment device, for sensors of different kind or similar.

In each embodiment of the disc brake according to the invention the adjustment device for the slack or clearance comprises a torque clutch. This torque clutch is torque-driven and serves for the selective transmission of a rotation between components of the torque clutch, which rotation is being dependent from the rotational direction, as this will be further explained in detail as follows.

According to a first aspect of the invention the torque clutch is formed as a roller-ramp-mechanism which acts between the amplification mechanism and the thrust element, in which the roller elements of the roller-ramp-mechanism are moveable in coaxial arrangement to the rod.

In other words, the roller elements of the roller-ramp-mechanism are arranged concentrically around the rod on a circular path and can move and roll, respectively, on that circular path stepwise in ramp surfaces which are arranged on that circular path and which are shaped in components of the roller-ramp-mechanism facing each other, as will be described below.

By that it shall not exclusively be understood that the roller-ramp-mechanism constitutes a component which is arranged between the thrust element or parts thereof and the amplification mechanism or parts thereof in a force-transmitting manner. In fact, such arrangement does not preclude that the thrust element or parts thereof can be in direct contact with the amplification mechanism or parts thereof in a force-transmitting manner.

According to a second aspect of the invention it is, independent from the actual configuration of the torque clutch, provided that the amplification mechanism, the adjustment device, the thrust element and the reset device on the one hand and the rod on the other is configured such and dimensioned in axial direction such that in the assembled condition of the brake actuation mechanism the reset device is set under pretension thereby forming a defined torque limit for the torque clutch.

According to a third aspect of the invention it is, in principle also independent from the actual realization of the torque clutch, provided that the reset device exerts a spring force in axial direction onto the torque clutch.

In the functional starting position of the brake actuation mechanism that spring force acts permanently.

The rod will be fixed in the rear side of the housing section of the brake caliper and thereby sets the reset device under a defined pretension, in which the reset device on one side acts onto the torque clutch and on the opposite side in direction towards the brake disc on the end of the rod, which end serves as a counter support or an abutment. With respect thereto it shall be referred to the method of assembly according to the invention, which is to be explained in detail later on.

Preferably, the reset device is configured as a resilient element, preferably as a coil spring, and is received on the side of the brake disc by an abutment cup which is axially fixedly arranged at the end of the rod. I.e. the spring is interlocked between the abutment cup and the torque clutch partly under compression.

The magnitude of the pretension being created thereby in this context results also from the configuration of the reset device; i.e., for example, for a coil spring from the number of turns, from the material to be used (spring constant) etc.

According to the invention the defined pretension shall be thereby selected such that on the one hand it is suitable for a desired return of the brake actuation mechanism and on the other hand for a desired torque limitation for the torque clutch.

The torque limit for the torque clutch, for example in the form of a roller-ramp-mechanism, shall be configured such that an induced rotation will be transmitted to at least one of the rotational components of the adjustment device as long as the torque, which is required for that transmission, is below a value which, among others, is defined by the force applied by the elastic element, i.e. by the spring force.

Thus, during a brake actuation stroke this force- and torque-dependent arrangement determines the transition of a condition in which the clearance between the brake disc and the brake lining can be compensated by a small force, and a condition, in which the braking contact between the brake disc and the brake lining takes place with a large force. Accordingly, the force- and torque-dependent arrangement of the adjustment device reacts to the clearance being present between the brake disc and the brake linings during the brake actuation and the return, respectively, and thereby ensures the automatic adjustment of that clearance.

Due to the fact that according to the invention the reset device on the one hand and the device for torque limitation with respect to the transition between both phases or conditions of the actuation stroke, as previously mentioned, on the other hand are integrated and combined in one single component, respectively, the construction of the brake actuation mechanism as a whole is simplified and due to less components the weight, the mounting efforts and the costs associated therewith will be minimized. Also, thereby the entire axial length of the brake actuation mechanism is reduced.

Also independent from the actual realization of the torque clutch the invention according to a fourth aspect refers to a disc brake, in which the adjustment device itself is supported in axial direction on the one side against the reset device and on the other side against the amplification mechanism, each by means of a low friction-bearing element.

The adjustment device includes, as will be explained in the following, an adjustment spindle which is in threaded engagement with a thrust piece, which cooperates with a brake lining, thereby forming the thrust element, in which the thrust piece is axially non-rotatably guided in the housing of the brake caliper.

A friction force acts against the rotation of these elements, which friction force is formed between components of the brake actuation mechanism as a result of the force applied by the reset device and which rotation will be transferred onto the adjustment spindle via the torque clutch.

Therefore it is provided according to the invention that the adjustment device is virtually "embedded" within the brake actuation mechanism by means of low friction-bearing elements, and namely in axial direction. The bearing elements thereby can include ball, roller or needle bearings.

According to the invention these bearing elements provided within the brake actuation mechanism are arranged outside of and beside the actual transmission path and of the distribution/flow of forces of the brake actuation force, respectively. Therefore these bearing elements can always be configured such that they don't have to resist large loads, since due to the construction of the brake actuation mechanism according to the invention the main distribution/flow of forces of the amplification mechanism is directed straight into the thrust element.

Furthermore, the arrangement and construction of the brake actuation mechanism according to the invention is designed in such a way that beside the above-mentioned surfaces, with the exception of the contact surface between the adjustment spindle and the thrust piece, no further contact surfaces as such do exist within the brake actuation mechanism, which contact surfaces could apply an increased friction-induced resistance against the adjustment process.

By that it is possible that during the actuation stroke the area of transition between the compensational movement for the clearance, for which only a small force is required, and the force introduction at contact of the brake linings with the brake disc upon braking, when substantially higher forces do act within the brake actuation mechanism, can be better determined and restricted, respectively, whereby the accuracy and reliability of the wear compensation is improved.

The roller-ramp-mechanism forming the torque clutch, which always acts between the amplification mechanism and the thrust element, is preferably arranged outside of the distribution/flow forces of the clamping force as well. Ideally the roller-ramp-mechanism thereby interacts with at least one of the low friction-bearing elements as previously mentioned either indirectly or directly.

For all embodiments as previously mentioned the amplification mechanism can comprise a lever which is supported on at least one eccentric support being transverse to the rod, in which at least one force-transmitting element is arranged between the lever and the thrust element by which the clamping force from the lever can be introduced into the thrust element.

The eccentric support provides the amplification of the force being induced by an actuator and can preferably be realized in such a way as this is described in the International Patent Application WO 2004/027281 A2 of the applicant, to which disclosure it is explicitly referred herewith.

According to the invention the thrust element can comprise an adjustment spindle which is in threaded engagement with a thrust piece which cooperates with a brake lining, in which the thrust piece is axially non-rotatably guided in the housing of the brake caliper. Preferably, the adjustment spindle is formed as a hollow spindle, in which the reset device and the roller-ramp-mechanism are arranged inside the hollow spindle. Thereby the axial mounting length of the brake actuation mechanism can be further reduced.

At its end opposite of the brake disc the adjustment spindle is non-rotatably connected with a gear wheel which cooperates both with the at least one force-transmitting element and with the roller-ramp-mechanism. For that purpose connecting means are used which form a plug connection by means of a press-fit, as e.g. rivets. These rivets are preferably arranged at the gear wheel, whereas corresponding blind holes are provided at the face surface of the adjustment spindle being directed towards the gear wheel.

According to the invention the roller-ramp-mechanism comprises a ramp body which is fixedly connected to the gear wheel, and a bearing ring, in which the roller elements are arranged loosely between the ramp body and the bearing ring.

Several ramp surfaces in series are arranged on a circular path running concentrically around the rod, both in the ramp body and in the bearing ring facing each other, which ramp surfaces receive the roller elements. Upon rotation of the bearing ring relative to the ramp body the roller elements run against ramps in the ramp surfaces and may, if applicable, leap over into the ramp surface being next in rotational direction. The exact functioning of this torque clutch shall be explained in more detail in connection with the adjustment of the clearance in the following.

In one embodiment the reset device is supported against the brake disc side end of the rod in an abutment or support cup and thereby applies a spring force onto the bearing ring, which, as explained previously, realizes a torque limit for the torque clutch.

In addition an external holding sleeve can be arranged between the reset device and the bearing ring, in which a low friction-bearing element is arranged between the bearing ring and the external holding sleeve and between the ramp body and the force-transmitting element, respectively.

According to a preferred embodiment the ramp body, the roller elements, the bearing ring and the external holding sleeve encase an internal holding sleeve and a hollow shaft in a coaxial and concentric manner, respectively, in which the internal holding sleeve and the hollow shaft are rotatably arranged on the rod.

Thereby, the internal holding sleeve and the hollow shaft are preferably connected by a free-wheel or sprag spring thereby coaxially encasing the latter on the rod, in which the hollow shaft is arranged to be set into rotation by the lever and in which the internal holding sleeve is non-rotatably connected to the bearing ring.

The gear wheel of the adjustment spindle is in engagement with an adjustment pinion which is rotatably supported in the housing of the brake caliper and which can be set into rotation from the outside of the housing.

Thus, according to the invention furthermore a separate rewinding device for the adjustment device is provided by means of which the adjustment device can be brought into a position which enables change of completely worn brake linings.

The adjustment pinion or gear, which is supported on a shaft in the housing in parallel to the rod, meshes with the gear wheel of the adjustment device. At least one end of the shaft, which is either conically or cylindrically formed, is thereby configured such that it can be actuated by a corresponding tool from the outside through a corresponding opening in the housing of the brake caliper. Alternatively, the brake disc side end of the shaft can be also configured for receiving a tool. By simple turning of the shaft with a tool the adjustment pinion and thereby the gear wheel, which is in connection with the adjustment spindle, will be set into rotation as well, whereby the adjustment spindle can be moved away from the brake disc. After exchanged brake linings the adjustment spindle can again be transferred into its starting operating position upon rotation in the opposite direction.

In a further preferred embodiment the thrust piece comprises at least one following or guiding pin, which guiding pin is slideably guided in parallel to the rod in an opening in the housing of the brake caliper outside of the distribution/flow of forces of the clamping force.

By that the thrust piece is only axially displaceably, however non-rotatably supported, so that the rotation of the adjustment spindle by means of its threaded engagement results in a mere translational movement of the thrust piece.

As already explained above, according to the invention, in particular the rod serves to keep the amplification mechanism and/or the adjustment device and/or the thrust element and/or the reset device together as a self-supporting assembly unit.

Substantially the rod provides the support and guidance for the single components of the brake mechanism. However, it may be required for a corresponding weight of the thrust element, that additional support means have to be provided for the thrust element. For example, it is possible to guide the thrust element via the brake linings at support surfaces in the carrier or in the caliper, as this has been already previously mentioned in connection with the European Patent No. 1 832 777 of the applicant, to which disclosure it is explicitly referred herewith. Different guiding and support means, in particular for the thrust element, thereby can be combined with each other.

The brake disc side end of the thrust piece is closed so that no dirt or water can enter the interior of the adjustment device comprising the torque clutch. For example, this can be realized by a separate cover or the thrust piece itself is made as a casted or forged one-piece component being entirely closed at the side facing the brake disc. The embodiment comprising a removable cover has the advantage that the return spring is accessible from the outside also at a later stage and, for example, can be set additionally under a desired pretension by means of a corresponding tool even if the entire brake actuation mechanism is mounted as a pre-mounted unit on the rod in the housing of the brake caliper.

Furthermore, a sealing sleeve is provided coaxially to the rod which extends between the surface shell of the thrust piece and a corresponding radial inner support surface of the housing of the brake caliper. The sealing sleeve can fold over upon displacement of the thrust piece in axial direction. Both ends of the sealing sleeve can be provided with enforcements comprising metal inserts, which do attach at corresponding sections of the thrust piece on the one side and at the housing of the brake caliper on the other side with clamping effect, press-fit, spring effect or similar without becoming loose.

If the front end of the thrust piece is closed the sealing sleeve constitutes the only sealing of the opening in the housing of the brake caliper facing the brake disc, which prevents entry of dirt and water into the interior and thereby protects the brake actuation mechanism.

The disc brake according to the invention furthermore can comprise a sensor device for the lining wear which indirectly or directly interacts with the thrust piece, in which the sensor device can be inserted as a unit from the rear into the housing of the brake caliper and freely traverses the housing of the brake caliper up to the thrust piece in parallel to the rod.

The sensor device is configured as a module which can be exchanged as a whole. For that a corresponding fixture opening is provided in the housing of the brake caliper, into which opening the sensor device can be sealingly inserted and fixed.

The sensor device comprises a transmitting element for transmitting the linear movement of the thrust piece into a rotational movement and a sensor element for detecting the rotational movement.

The transmitting element is formed as a sleeve being attached to the thrust piece, which is displaceably arranged relative to a stationary but rotatably supported threaded element. The sleeve is in engagement with the threaded element in such a way that upon displacement of the sleeve, together with the linear movement of the thrust piece, the threaded element is set into rotation. At its end facing away from the brake disc the threaded element interacts with one sensor element in a touchless manner.

Since the threaded element just rotates, the sensor element detects the rotational movement which can be computed into the actual existing wear by a corresponding calculating circuit of the sensor element, which wear results from the linear adjustment movement performed by the thrust piece.

Preferably the at least one sensor element is formed as a Hall-sensor and interacts with at least one magnet being arranged at the end of the threaded element facing away from the brake disc in a known manner.

In order to facilitate the detection of the wear the pitch of the threaded element according to one preferred embodiment is selected such that by the threaded element at most one complete rotational turn will be performed over the entire possible linear displacement of the sleeve. By that the calculating circuit can be simplified, since not more than one turn corresponding to a maximal possible wear has to be allocated.

In order to always ensure a perfect contact between the sleeve and the thrust piece, in particular with respect to the vibrational and rocking loads existing in the brake surroundings, the sleeve is biased in axial direction. A spring surrounding the threaded element is supported between a rear housing section of the sensor device and the sleeve. The exposed area in the extended condition of the sensor device thereby will be protected against dirt by a corresponding bellows.

Alternatively, also a sensor device can be provided, which is formed as a module and which attaches directly to the shaft of the adjustment pinion. Since the adjustment pinion is directly coupled with the gear wheel of the adjustment spindle thereby the rotational movement of the gear wheel, which correlates with the adjustment, can be detected and computed in a corresponding calculating circuit. The entire sensor device can be detached as a unit from the shaft in order to enable access to the shaft for a tool during brake pad change.

With all embodiments as described above the disc brake is suitable in particular for a simple assembly of the brake actuation mechanism in the housing of the brake caliper, in which the axial rod plays an important role.

As already mentioned previously the rod serves to keep together either all components as one single module or several components as separate sub-modules, each as pre-mounted self-supporting assembly units, depending on how the space conditions are determined by the size of the brake caliper, and so serves to fix these modules in the housing of the brake caliper. The separate sub-modules can then finally be assembled inside the housing of the brake caliper.

Thus, on the one hand the rod serves as guiding means and fixation means for the components upon brake actuation, upon adjustment of the clearance and upon reset of the disc brake in the assembled condition. On the other hand it functions as assembly fixture in the housing of the brake caliper during the assembly of the brake actuation mechanism.

Thus, according to the invention a method for manufacturing a disc brake with the above-mentioned features is proposed, which comprises the steps:

inserting of an adjustment pinion into the housing of the brake caliper and fixing on a shaft in the housing, inserting of a first unit comprising an amplification mechanism, an adjustment device having a gear wheel and a reset device and a rod keeping them together in the housing of the brake caliper, in which the rod will be inserted into a rear opening of the housing of the brake caliper, so that the gear wheel comes into threaded engagement with the adjustment pinion, attaching of a support tool with an adjustment tool, in which the adjustment tool is rotatably guided in the support tool, at the brake caliper such that the adjustment tool attaches to the end of the rod facing the brake disc, rotating of the adjustment tool, so that an opposite free end of the rod will be displaced through the rear opening in the housing of the brake caliper, attaching of at least one support and fixation means at the free end of the rod, rotating of the adjustment tool in opposite direction so that the rod is displaced in the opposite direction and the support and fixation means is interlocked in the rear opening in the housing of the brake caliper and the rod is non-moveably fixed in the housing in axial direction thereby, and removing of the support tool with the adjustment tool, in which after fixation of the rod the reset device is biased by a defined pretension.

In one embodiment the support tool is formed as an U-shaped bracket or clamp which overlaps the housing section for receiving the brake actuation mechanism between the opening facing the brake disc and the opposite rear side of the brake caliper, in particular in such a way that the support tool cannot be moved relatively to the housing section of the brake caliper and therefore serves as a guiding and support means for the adjustment tool, respectively. The setting or adjustment tool is guided by means of a thread in one arm of the clamp, which attaches to the opening facing the brake disc. In this connection, an adjustment screw is used as a tool, which can be actuated by hand or by a corresponding tool.

As an example, wedge-shaped cotter pins can be utilized as support and fixation means. For that purpose the opening for the rod in the rear housing section opens to the outside in a cone-shaped manner so that upon movement of the rod in the opposite direction the wedge-shaped cotter pins will be jammed against the cone-shaped opening and thereby the rod will be interlocked in its axial position.

The assembly of the brake actuation mechanism can be performed with several sub-modules.

A first sub-module includes the unit as described above, in which the gear wheel is still fixed to an adjustment spindle.

In this embodiment the method according to the invention then further comprises the steps:
  inserting of a thrust piece with a sealing sleeve attached thereto with one free end into the housing of the brake caliper such that the adjustment spindle and the thrust piece come into threaded engagement.

In the present case the thrust piece with the sealing sleeve thus forms a second sub-module.

According to an alternative embodiment according to the invention the first sub-module includes the above-mentioned unit, however, without an adjustment spindle being fixed to the gear wheel, whereas the second sub-module is made from the thrust piece and the adjustment spindle which both are already in threaded engagement. In addition a sealing sleeve is attached to the outside of the thrust piece.

In this embodiment the method according to the invention then comprises the further steps:
  inserting of a further unit comprising a thrust element with an adjustment spindle and a thrust piece being in threaded engagement with the adjustment spindle and a sealing sleeve being attached to the thrust piece with its free end into the housing of the brake caliper,
  attaching of a support tool with an adjustment tool at the brake caliper such that the adjustment tool attaches to the thrust piece,
  rotating of the adjustment tool till the adjustment spindle will be in a fixed connection with the gear wheel, and
  removing of the support tool with the adjustment tool.

This fixed connection finally is realized in that pins or rivets protruding from the gear wheel in axial direction do engage with corresponding bores in the face surface of the adjustment spindle and do form a press-fit.

In order to prevent rotational movement of the thrust piece the same comprises a guiding pin.

Independent from the way how the single sub-modules according to the above-mentioned embodiments of the method will be mounted, the method according to the invention comprises the further steps:
  aligning of the guiding pin with a corresponding guiding opening in the housing of the brake caliper,
  rotating of the adjustment pinion such that the thrust piece, by slidable inserting of the guiding pin into the guiding opening, moves onto the adjustment spindle.
  Afterwards, the further steps do follow:
  attaching of a further support tool at the brake caliper for axial guiding a push sleeve tool surrounding the thrust piece so that the push sleeve tool comes into contact with the sealing sleeve,
  displacing of the push sleeve tool such that the sealing sleeve will be displaced into the housing of the brake caliper till the free end of the sealing sleeve does abut against a corresponding radial support surface in the housing of the brake caliper, and
  removing of the support tool with the push sleeve tool.
Therewith, preferably a press-fit will be formed.

The support tool for the sealing sleeve is also formed as some kind of U-shaped clamp which overlaps the housing of the brake caliper. The clamp arm facing the brake disc comprises a half ring with a groove into which the push sleeve tool is inserted. At the opposite end again an adjustment tool is provided, for example an adjustment screw. The push sleeve tool attaches to the free end of the sealing sleeve and the push sleeve tool together with the sealing sleeve is moved into the interior of the brake caliper upon rotation of the adjustment screw till the radial support surface for the sealing sleeve is reached.

Then, after also this auxiliary assembly means has been removed finally the adjustment pinion is rotated till the thrust piece has reached its operating position.

According to the invention already part of the pretension can be realized during the pre-assembly of the unit on the rod, which unit consists of the adjustment device, the amplification mechanism and the reset device, in that the axial dimensions of these single components will be selected, accordingly. This pretension can be maintained by corresponding snap rings or any other radial fixation means at the rod.

The remaining pretension which defines the spring force acting on the torque clutch and the torque limitation, respectively, then will finally be applied onto the reset device or spring when the unit will be mounted in the brake caliper.

For that purpose a corresponding pressure tool can be utilized which further compresses the spring. According to an alternative embodiment a thread is provided at the end of the rod facing the brake disc onto which a threaded nut can be screwed which cooperates with the abutment cup. By rotating the threaded nut the spring can be further compressed in relation to the further brake components on the rod in axial direction and thereby the pretension required for the torque limit can be realized.

The final pretension, which is larger than the pretension realized by the pre-assembly, is finally maintained in that the rod with the brake components axially fixed on or around it will be axially biased in the housing of the brake caliper by means of the rear support and fixation means, e.g. a threaded nut or by two cotter halves, if the adjustment tool will be reversely rotated so that the rod itself cannot axially move anymore.

The initial pretension is sufficient to keep the entire brake mechanism with its brake components on the rod. The self-supporting unit formed thereby can be supported in an easy manner and can be transported, both with respect to the assembly in the brake caliper and for future overhaul works.

After the final pretension has been applied the load acting on the snap rings or onto other radial fixation mechanisms, with which the initial pretension has been maintained, fades since the final pretension of the spring is directly introduced into the housing of the brake caliper which then functions as counter support. Due to this fact it is possible that the adjustment device in fact can be returned properly, in which this can be realized by a minimum compression during this step of assembly.

Basically, the invention is advantageous in that besides the rod only very few fixation means are required for the assembly of the brake actuation mechanism and its fixation in the brake caliper. The number of pieces is thereby less than in the prior art by which the assembly can be performed in a more simple, quick and cost-efficient manner.

Moreover, plenty of standard parts and rotational symmetric components can be utilized, the manufacture of which also proves to be substantially more simple.

Furthermore, the brake actuation mechanism according to the invention is characterized by its compact design in particular in axial direction with at the same time efficient functional safety so that also the length of the brake caliper, associated with a reduction in weight, can be reduced. The specific configuration of the brake actuation mechanism according to the invention can be transported and handled as one unit.

BRIEF DESCRIPTION OF THE DRAWINGS

Further advantages and features of the present invention do become apparent with respect to the embodiments shown in the attached drawings.

DETAILED DESCRIPTION OF THE INVENTION

Figure 1:
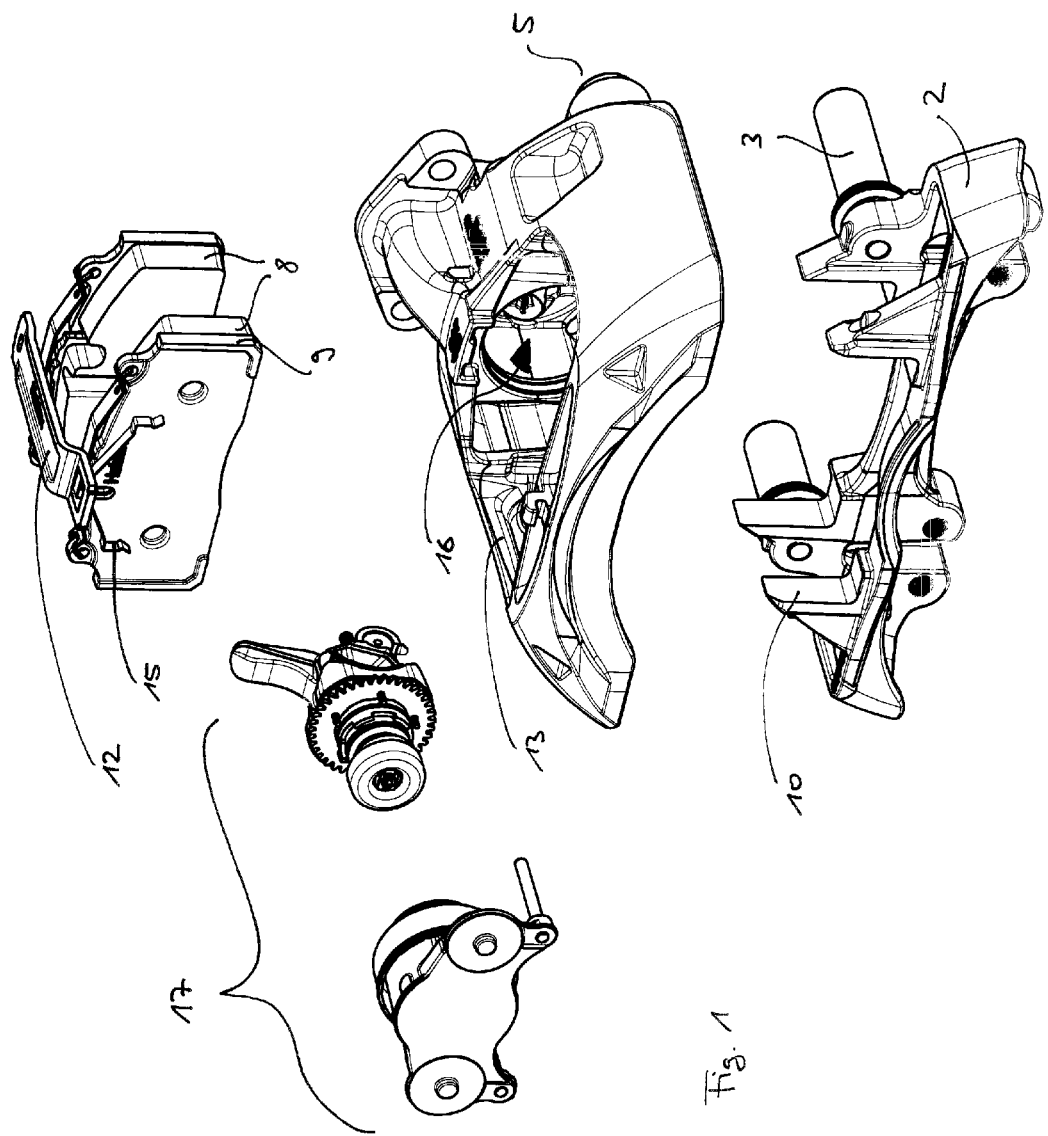
FIG. 1 is an explosive view of the substantial components of a disc brake according to the invention.
Figure 2:
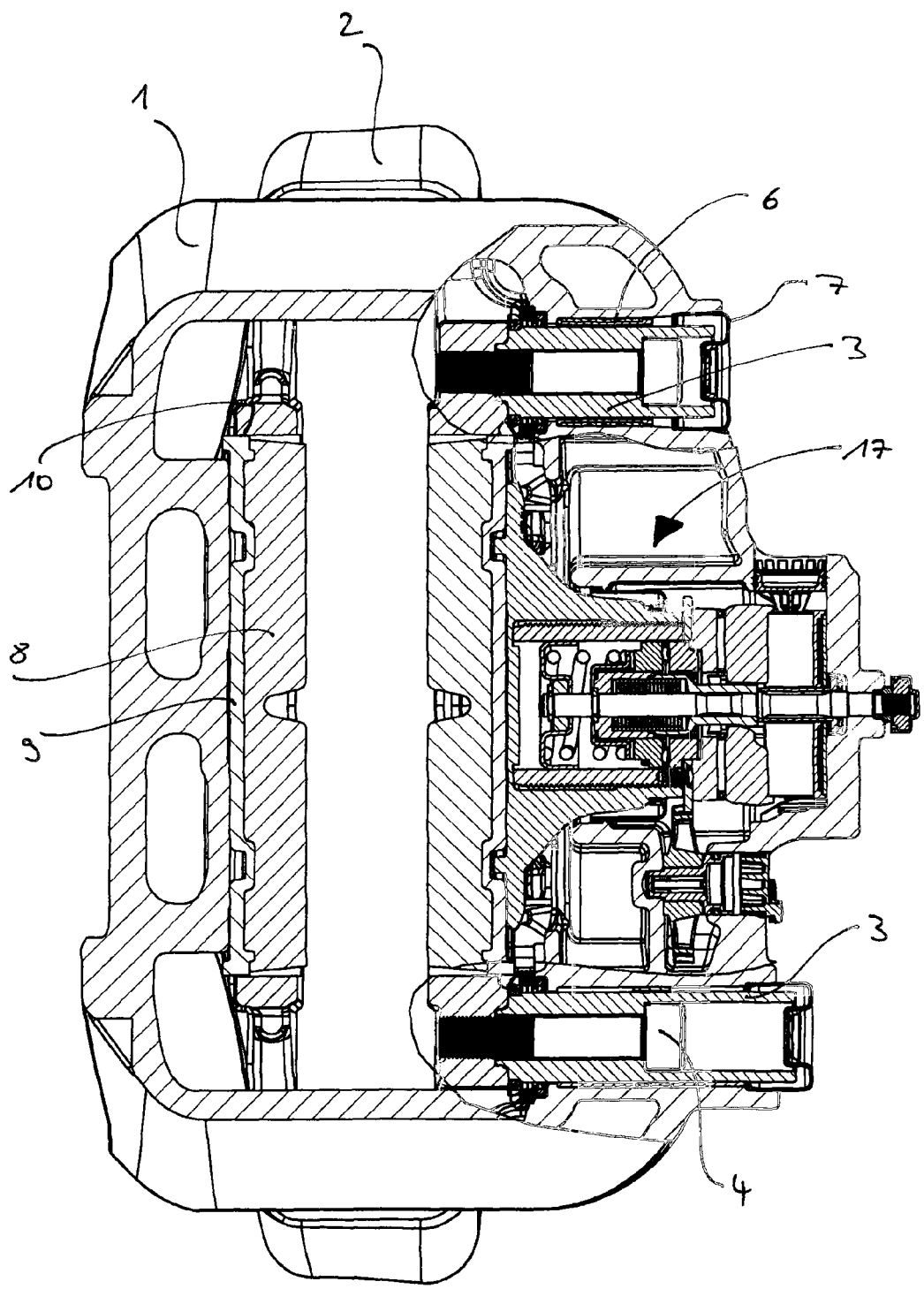
FIG. 2 is a view from above, partly in section, of the disc brake in the assembled state.
Figure 3:
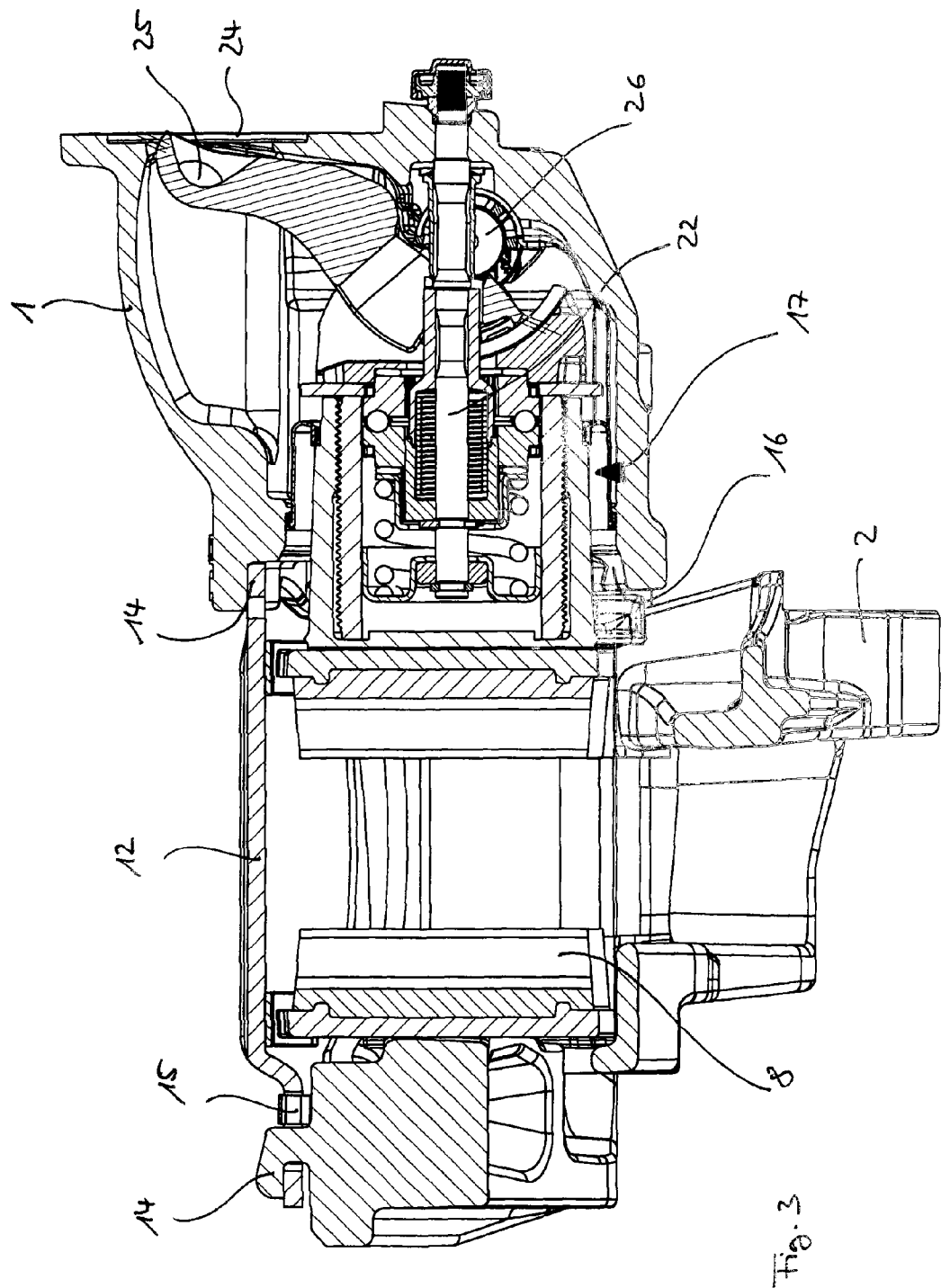
FIG. 3 is a lateral cross-sectional view of the disc brake in the assembled state.

FIG. 1 shows the disc brake according to the invention in explosive view with its substantial components, which are shown in their assembled state in FIG. 2 and FIG. 3, respectively.

The disc brake comprises a brake caliper 1 which is slideably guided on a carrier 2. For that purpose the brake caliper 1 is guided on the carrier 2 by means of slide bearings 3.

The slide bearings 3 are fixed to the carrier 2 by means of bolts 4 and received in openings 5 in the housing of the brake caliper 1, correspondingly. Elastic slide bearing elements 6 are provided between the slide bearing 3 and the inner wall of the openings 5, as this, for example, has been explained in the German Utility Model no. 20 2008 006 779 of the applicant.

In order to ensure a proper functioning of the slide bearing mechanism made in such a way, the openings 5 in the brake caliper 1 are sealingly closed to the outside by means of end caps 7, as these, for example, have been explained in the German Utility Model no. 20 2009 003 262 of the applicant.

The brake caliper 1 overlaps and surrounds, respectively, brake pads 8 which are fixed on pad retainers 9. The pad retainers 9 with the brake linings 8 attached thereto are axially guided in corresponding guidances 10 of the carrier 2. The pad retainer 9 will be biased by means of retainer springs 11 so as to be safe against vibrations, which springs 11 for that purpose are supported against a holding bracket 12, which overlaps an opening 13 in the housing of the brake caliper 1 being directed upwardly, through which opening 13 the brake linings 8 with their pad retainers 9 can be inserted and removed for the purpose of assembly. At its both sides the holding bracket 12 reaches below and behind, respectively, corresponding protrusions or recesses 14 being attached to and shaped at the brake caliper 1, so that the holding bracket 12 cannot evade upwardly and thereby is able to form an abutment for the pad retainer springs 11.

Displacement of the mounting bracket 12 in longitudinal direction is prevented in that it interacts at one side with a locking device 15 being formed as a spring, which locking device 15 in turn is interlocked with the brake caliper 1, as this, for example, is explained in the German Utility Model no. 20 2008 013 446 of the applicant.

Both brake linings 8 enclose a brake disc not shown herein which is fixed to a corresponding hub or to a part being connected with the hub of a wheel axle.

As can be seen in FIG. 1 the brake caliper 1 comprises at the side facing the brake disc an opening 16, through which opening 16 a brake actuation mechanism 17 can act onto the brake disc and through which opening 16, as will be explained in connection with FIGS. 11 to 22 further down below, the brake actuation mechanism 17, depending on the embodiment, can be assembled with different modules in the housing of the brake caliper 1.

Figure 4:
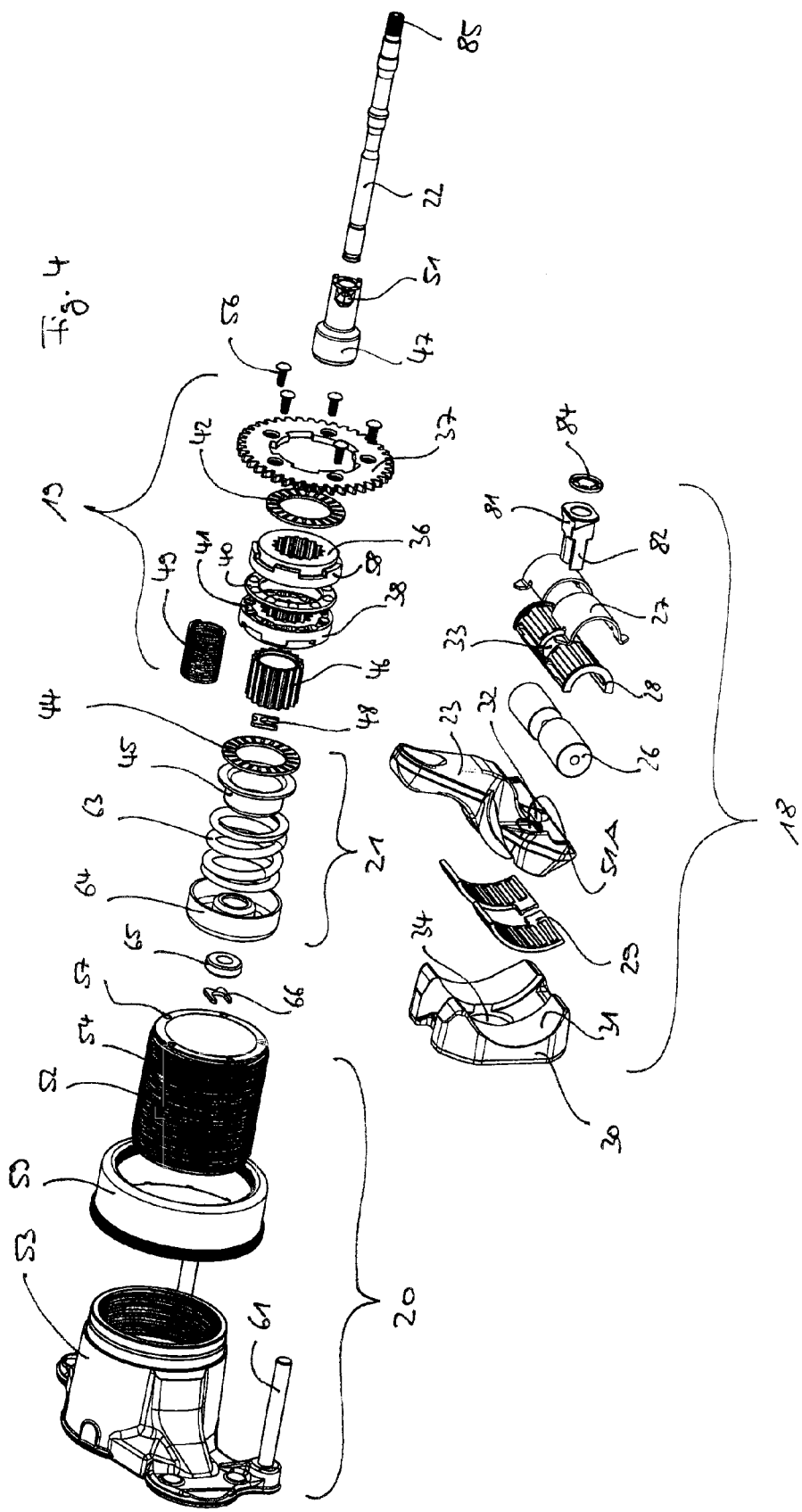
FIG. 4 is an explosive view of the brake actuation mechanism according to the invention with its single components.
Figure 5:
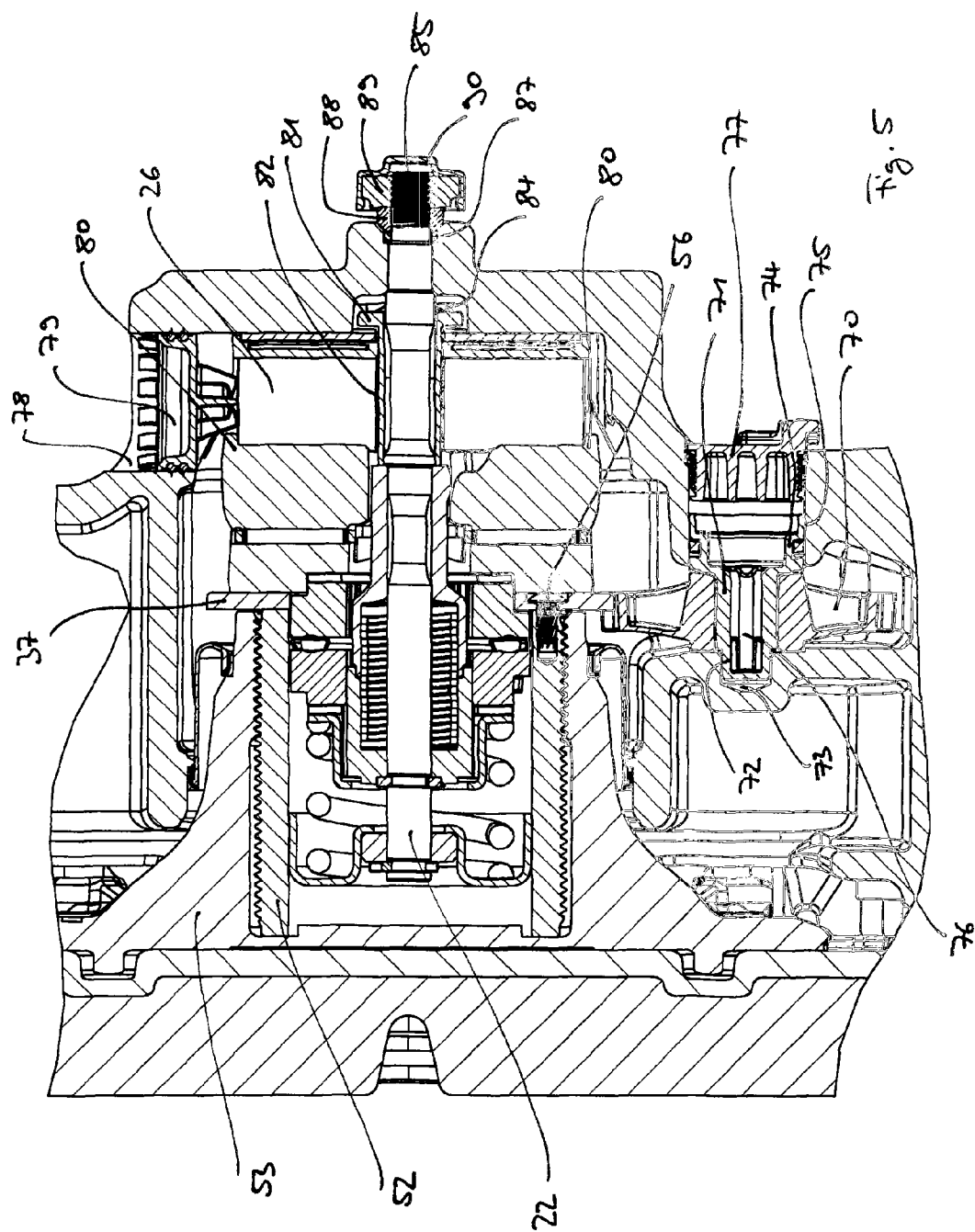
FIG. 5 is an enlarged section from FIG. 2 showing the brake actuation mechanism.
Figure 6:
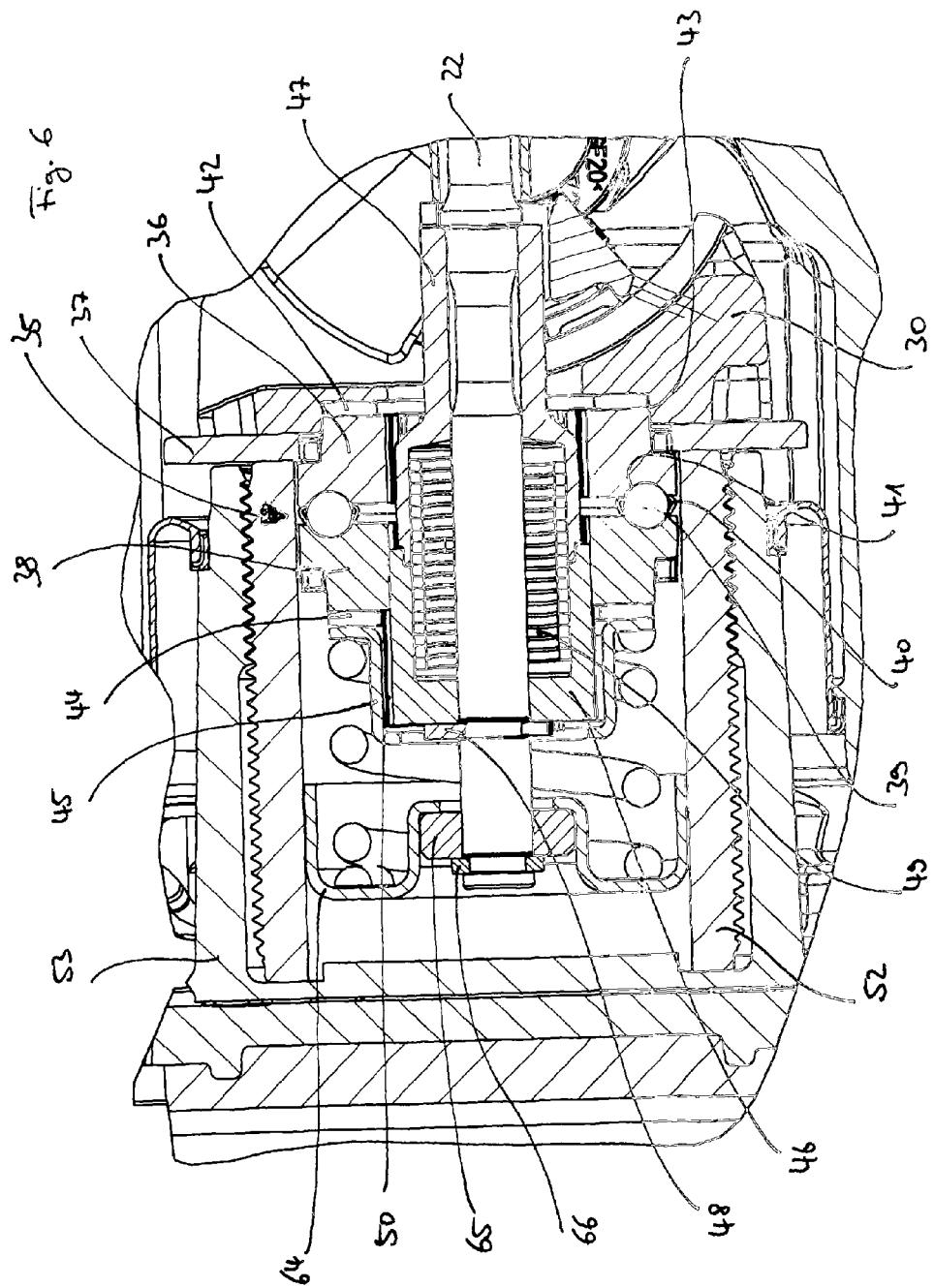
FIG. 6 is an enlarged section from FIG. 3 showing the brake actuation mechanism.
Figure 7:
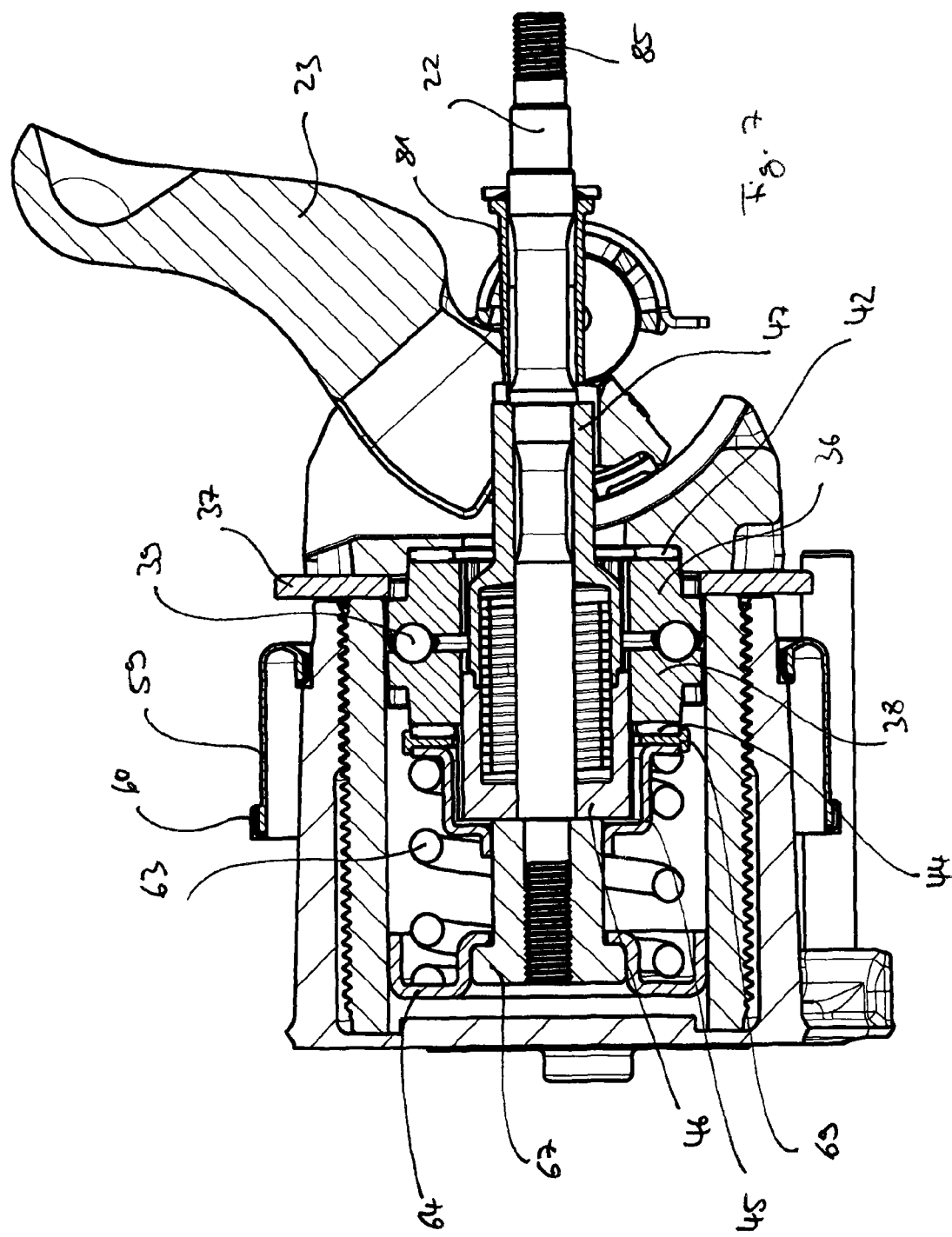
FIG. 7 is a side view of the brake actuation mechanism according to a further embodiment of the invention.

FIG. 4 shows an explosive view of the brake actuation mechanism 17 with its single components, whereas FIGS. 5 to 7 do show the same in its functional mounting position in the housing of the brake caliper 1.

The brake actuation mechanism 17 according to the invention is designed in such a way that it on the one hand enables a simple assembly in the brake caliper 1 and on the other hand realizes a faultless functioning with at the same time compact configuration due to the specific arrangement of the single components in relation to each other.

According to the invention the brake actuation mechanism 17 substantially comprises an amplification mechanism 18, which introduces an actuating force originating from an hydraulic, pneumatic or electro-mechanical actuator (not shown herein) (or from an actuator combining these types) as a clamping force into the brake actuation mechanism 17 and thereby enforcing it in correspondence with a gear ratio being determined by its construction, an adjustment device 19, which serves for compensation of brake lining wear, a thrust element 20, which transmits the enforced clamping force onto the brake disc, and a reset device 21 in order to return the brake actuation mechanism 17 in its starting position, in case no brake force is applied anymore by the actuator, which is arranged outside of the housing of the brake caliper 1.

Thereby, a crucial feature of the disc brake according to the invention is that the above-mentioned assembly groups are arranged on one central rod 22, which is aligned co-axially to the axis of the brake disc.

As it becomes apparent from the following description the rod 22 serves as mounting means for the single assembly groups of the brake actuation mechanism on the one hand and as fixation means for the same in the housing of the brake caliper 1 on the other.

The amplification mechanism 18 comprises a lever 23 the upper end 25 of which, which passes through an opening 24 in the brake caliper 1, is attached by a transmitting means of the actuator not shown herein, for example a rod of a pneumatic cylinder. The lever 23 is pivotably supported in the rear housing section of the brake caliper 1 in that it is rotatably supported against two eccentric rollers 26. The cylindrical eccentric rollers 26 are rotatably received in a corresponding needle bearing cage 28, which is arranged in two support cups 27, in which the support cups 27 are supported in the rear housing section of the brake caliper 1.

In doing so, the lever 23 is designed and configured in relation to the eccentric rollers 26 such that upon a pivoting movement around the eccentric rollers 26 an eccentric displacement of the lever 23 in relation to the eccentric rollers 26 takes place, which eccentric displacement or offset results in an enforcement of the force being introduced from the actuator into the lever 23. With respect to the exact configuration and functioning of the eccentric support of the lever 23 it is herewith referred to the disclosure of International Patent Application no. 2004/027281 A2 of the applicant, to which disclosure it is explicitly referred herewith.

Opposite to the eccentric rollers 26 the lever 23 is supported against a force-transmitting element 30 via further needle bearing cups 29. The force-transmitting element 30 is formed as one piece, preferably as a casted or forged component, and comprises on the side of the lever two substantially half cup-type recesses 31 which serve for receiving the needle bearing cups 29. On the side of the brake disc the force-transmitting element 30 is formed with planar surfaces in order, as will be described below, to interact with the adjustment device 19 and thereby with the thrust element 20.

For the passage of the central rod 22 the lever 23 comprises an opening 32, the needle bearing cage 28 comprises an opening 33 and the force-transmitting element 30 comprises an opening 34, whereas the support cups 27, the eccentric rollers 26 and the needle bearing cups 29 are arranged to both sides of the rod 23 at corresponding positions, respectively.

The adjustment device 19 is provided directly following the amplification mechanism 18 in direction towards the brake disc.

The adjustment device 19 includes a torque clutch, the functioning of which will be explained in the following. The torque clutch is formed as a roller-ramp-mechanism 35, the single components of which can be at best seen in FIG. 6.

The roller-ramp-mechanism 35 comprises a ramp body 36 which is non-rotatably fixed with a gear wheel 37 at its side facing away from the brake disc. The function of the gear wheel 37 shall be further explained down below.

Opposite to the ramp body 36 a support or bearing ring 38 is provided. The bearing ring 38 and the ramp body 36 encase several rollers 39 which are guided in a roller cage 40 and which are arranged between the bearing ring 38 and the ramp body 36 co-axially moveably around the rod 22.

The rollers 39 are each received by ramp surfaces 41, which are formed in the bearing ring 38 on the one side and in the ramp body 36 on the other side thereby facing each other. One ramp surface 41 is followed by a subsequent ramp surface 41, respectively, in which all ramp surfaces 41 are arranged on a closed circular path around the rod 22. In FIG. 4 these ramp surfaces 41 can be only seen for the bearing ring 38. In this connection, each ramp surface 41 can be divided into different sections which comprise different inclination angles. Thereby, the inclination angles can be selected in such a way that at interaction with the pretension the limiting torque for the torque clutch can be better tuned.

The ramp body 36 is supported against the force-transmitting element 30 by at least one low friction-bearing element 42 which is provided in a cylindrical recess 43 at the side of the force-transmitting element 30 facing the brake disc.

Correspondingly, the bearing ring 38 is supported against an external holding sleeve 45 by means of a further low friction-bearing element 44.

The external holding sleeve 45 and partly the bearing ring 38 do co-axially enclose an internal holding sleeve 46 and partly the bearing ring 38 and the ramp body 36 with the rollers 39 there in between do co-axially enclose a hollow shaft 47.

The inner holding sleeve 46 and the hollow shaft 47 do mate at their face surfaces and are rotatably supported on the central rod 22, in which the internal holding sleeve 46 is axially fixed on the rod 22 by means of a snap ring or circlip 48.

The hollow shaft 47 and the internal holding sleeve 46 in turn do co-axially enclose an override or sprag spring 49, in which the radial external surface of the sprag spring 49 is connected both with the radial inner surfaces of the hollow shaft 47 and of the internal holding sleeve 46, so that these both elements can, if needed, be non-rotatably connected with each other.

The internal holding sleeve 46 is non-rotatably connected with the bearing ring 38 by means of a toothing or serration 50. In this connection, the serration can additionally comprise rolling elements or rollers being supported in between in order to form a rolling guidance between the internal holding sleeve 46 and the bearing ring 38, which is associated with a very small friction in axial direction.

In turn, the hollow shaft 47 comprises a pin-like element 51 with which the lever 23 is connected, in which this connection is designed such that upon a pivoting movement of the lever 23 the hollow shaft 47 will be set into rotation by means of this pin-like element 51. In this connection, the hollow shaft 47 completely passes the force-transmitting element 30.

It can be recognized from the figures that all components of the adjustment device 19 are substantially formed as rotational-symmetric elements and are co-axially arranged around the rod 22.

The thrust element 20 is provided thereby encasing the adjustment device 19, the thrust element 20 being arranged co-axially to the rod 22 as well.

The thrust element 20 comprises a hollow adjustment spindle 52 which at the outside is in engagement with the thrust piece 53 by means of a corresponding thread 54. For reasons of a better force distribution the thrust piece 53 spreads towards the brake disc like a trapeze and is fixed at the pad retainer 9 of the inner brake lining 8 by means of corresponding connecting elements, such as e.g. a pin-groove-connection 55, as this can be seen from FIG. 2.

At its face surface facing away from the brake disc the adjustment spindle 52 is non-rotatably connected with the gear wheel 37 of the adjustment device 19 by means of corresponding connecting elements 56, such as e.g. rivets 56, which form a press-fit with corresponding blind bores 57 in the face surface of the adjustment spindle 52.

The gear wheel 37, in turn, is in a non-rotatable connection with the ramp body 36 by means of a splined connection 58.

Thereby a rotational movement of the ramp body 36 will be indirectly transmitted onto the adjustment spindle 52.

At the outside a sealing sleeve 59 is arranged at the thrust piece 53 which seals the free space between the thrust piece 53 and the corresponding inner wall of the housing of the brake caliper 1 towards the brake disc in order to prevent the entry of moisture and dirt into the interior of the brake caliper 1, so that the functional safety of the brake actuation mechanism 17 is assured at any time.

The sealing sleeve 59 can be unrolled in axial direction in an elastic manner and comprises at its face surfaces, respectively, metal inserts 60, which can be spring-loaded and which provide a proper press-fit at the corresponding attachment surfaces in the housing of the brake caliper 1.

Figure 18:
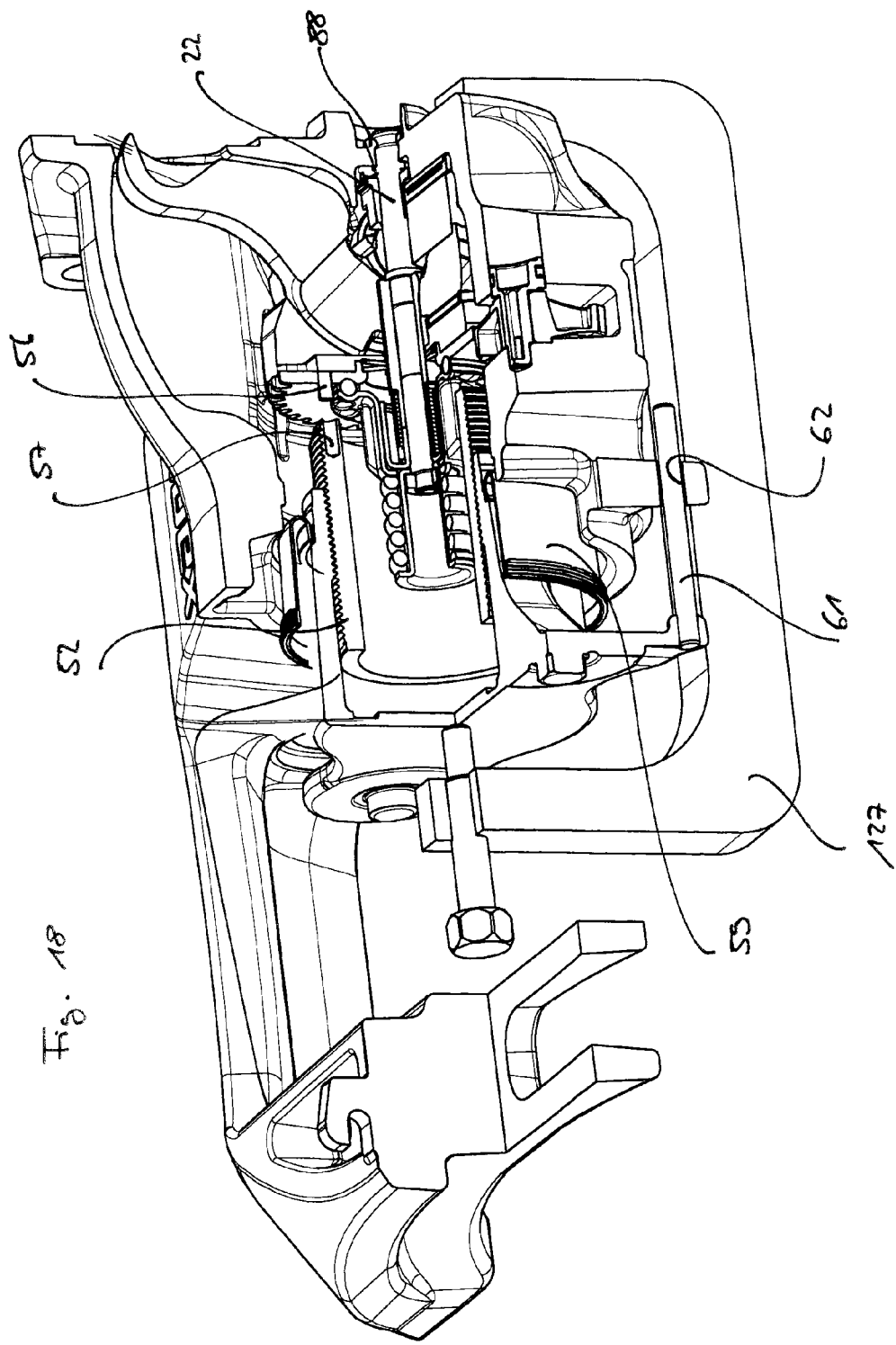
FIG. 18 schematically shows a fourth step for the method according to the second embodiment.
Figure 19:
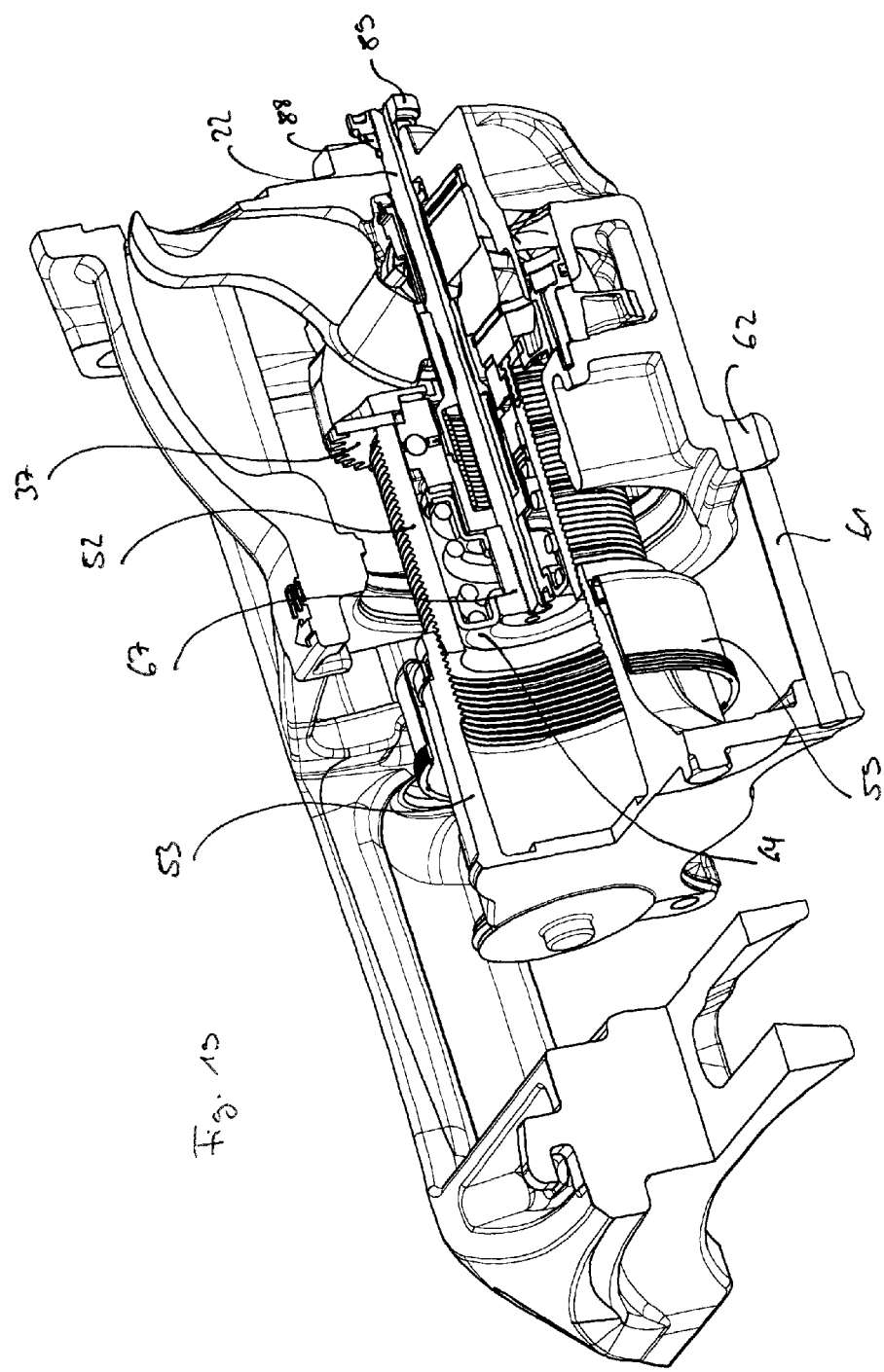
FIG. 19 schematically shows a fifth step of the method both according to the first and to the second embodiment.
Figure 20:
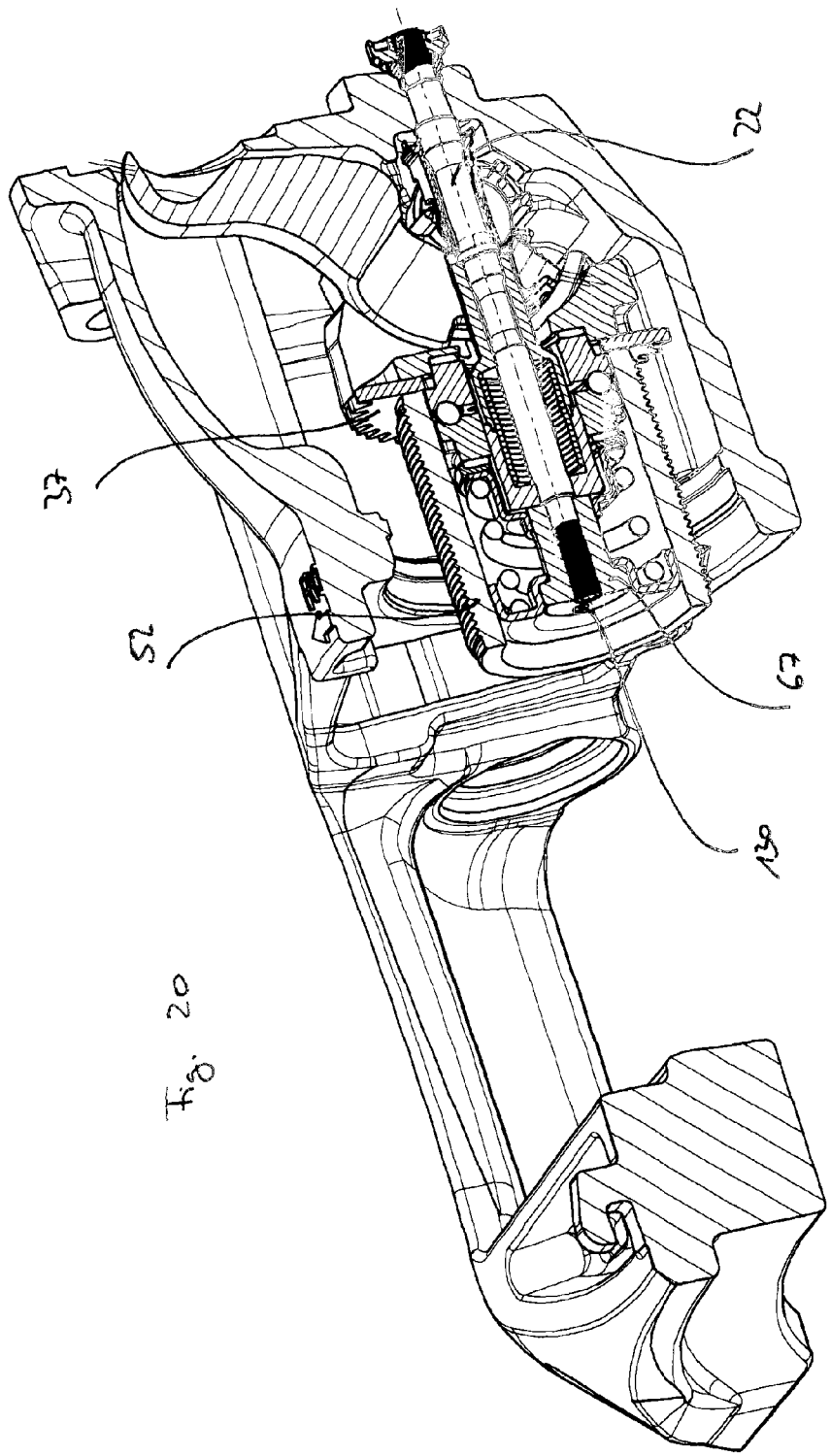
FIG. 20 schematically shows a first module in the mounted state of a disc brake according to the embodiment of FIG. 7.

The thrust piece 53 furthermore comprises at least one guiding element, for example a guiding pin 61, which is received in a corresponding opening 62 in the brake caliper 1, as this, for example, can be seen in FIGS. 18 and 19. By that it is ensured that the thrust piece 53 is non-rotatably guided relative to the brake caliper 1 and that a rotational movement of the adjustment spindle 52 will be transferred into an axial longitudinal movement of the thrust piece 53.

The adjustment spindle 52 does not only co-axially encase the adjustment device 19, but also the reset device 21.

The reset device 21 follows the adjustment device 19 in axial direction towards the brake disc and is arranged co-axially with respect to the rod 22 as well.

The reset device 21 is made of a coil spring 63 which abuts against an abutment cup 64 at the side of the brake disc. The abutment cup 64 is axially positioned and fixed at the end of the rod 22 facing the brake disc by means of a distance ring 65 and a snap ring 66.

At its opposite side the coil spring 63 abuts against the external holding sleeve 45 of the adjustment device 19. In this way the reset device 21 can function at the same time as a mechanism for applying a torque limitation onto the adjustment device 19, as this shall be explained in connection with the description of the functioning of the adjustment device 19 and the brake actuation mechanism 17.

FIG. 7 shows an alternative embodiment of the reset device 21.

Also in this embodiment the coil spring 63 abuts against an abutment cup 64. In this connection, however, the abutment cup 64 is axially fixed on the rod 22 by means of a threaded nut 67 which is screwed onto the thread 68 on the rod 22 facing the brake disc. By a defined rotation of the threaded nut 67 in relation to the rod 22 a defined pretension can be applied onto the coil spring 63.

In addition in this embodiment a guiding ring 69 is provided between the external holding sleeve 45 and the low friction-bearing element 44. The guiding ring 69 supports the positioning and as well the axial and radial guidance of the components relative to each other, which components are adjacent to the guiding ring 69.

The low friction-bearing element 44, among others, serves also to eliminate the risk that in particular at release of the brake the adjustment function will be influenced by a minor rewind of the coil spring 63.

As can be seen from FIG. 5 the gear wheel 37 of the adjustment device 19 meshes with an adjustment pinion 70 which is supported on an axis in the housing of the brake caliper 1, which axis is parallel to the rod 22.

The axis is formed by an adjustment shaft or shaft body 71 which comprises a corresponding toothing and which is supported with its free end 72 in a bearing blind bore 73 provided in the housing of the brake caliper 1 and with its opposite end 74 in an opening 75 in the brake caliper 1, which can be accessed from the outside. The shaft body 71 virtually is inserted as a plug into the opening 75, whereas, however, such tolerances are provided that the shaft body 71 can be rotated in the opening 75, when exceeding a defined torque. For that purpose the end 74 of the shaft body 71 comprises a socket 76 which serves for receiving a tool with which the shaft body 71 and thus the adjustment pinion 70 and by that, in turn, the gear wheel 37 with the adjustment spindle 52 can be rotated as shall be explained further down below.

The opening 75 can be sealingly closed from the outside by means of a correspondingly shaped closure cap 77.

The housing of the brake caliper 1 further comprises an additional lateral assembly opening 78 which is provided in axial extension to the rotational axis of the eccentric rollers 26.

Through this opening 78 the assembly and alignment of the bearing cups 27 and of the needle bearing cage 78 as well as of the eccentric rollers 26 can be performed and supported. Moreover, through this opening 78 the bearing and support surfaces inside the housing of the brake caliper 1 can be machined.

The assembly opening 78 can be closed by a sealing plug 79 as well. Transverse to the axial direction, i.e. lateral towards the outside, the eccentric rollers 26 are guided and positioned by edges 80 protruding from the lever 23. At the opposite sides the eccentric rollers 26 are separated from the rod 22 by means of a distance sleeve 81 which virtually provides the inner lateral bearing surfaces for both eccentric rollers 26.

The position of the distance sleeve 81 is determined in axial direction by means of a spring ring 84 on the one side and by way of attaching to the hollow shaft 47 on the opposite side.

At its rear end facing away from the brake disc the rod 22 comprises a thread 85. In the mounted state this thread 85 is located outside of the housing of the brake caliper 1, since the rod 22 passes an opening 86 in the brake caliper 1.

The opening 86 opens itself conically and serves for receiving a tapered ring 88, thereby supporting a sealing ring 87 there in between.

As shall be explained in connection with FIGS. 16 and 17 further down below, the tapered ring 88 will be biased by means of a fixation nut 89 to be screwed onto the thread 85 in the opening 86 during assembly. An end cap 90 overlaps the fixation nut 89.

As can be seen from the figures the rod 22 comprises a corresponding contour with different diameters and groove arrangements in order to provide the support and bearing surfaces and the assembly means for the axial positioning of the single components as mentioned above.

In this connection it is a crucial aspect of the invention that the rod 22 on the one hand and the single components of the amplification mechanism 18, of the adjustment device 19 and of the reset device 21 supported on it on the other hand are dimensioned in axial direction and configured such that in the mounted, biased condition of the rod 22 in the rear portion of the brake caliper, the coil spring 63 exerts a defined torque limitation by means of a then created permanent pretension onto the torque clutch, which exists in the adjustment device 19 in the form of a roller-ramp-mechanism 35.

This torque limit also will be realized by corresponding assembly steps of the brake actuation mechanism 17, as shall be explained further down below.

The functioning of the brake actuation mechanism 17 according to the invention with the adjustment device 19 is as follows.

If a force is introduced from the actuator the lever 23 pivots around the eccentric rollers 26 and sets the hollow shaft 47 by means of the pin-like element 51 into rotation. In this connection the lever 23 comprises a recess or groove 51A, as this can, for example, be seen in FIG. 8.

If there is no contact with the brake lining 8 and the brake disc yet and thus no brake force will be transmitted, the sprag spring 49 locks the hollow shaft 47 with the internal holding sleeve 46 so that both do rotate together. Since the internal holding sleeve 46 is non-rotatably connected with the bearing ring 38 by means of the toothing 50, the support ring 38 co-rotates, accordingly.

Depending from the spring force exerted by the coil spring 63, which provides the defined torque limit, the bearing ring 38 also rotates the ramp body 36 and therewith the gear wheel 37 which is non-rotatably connected therewith by means of a splined connection 58, and finally therewith the adjustment spindle 52. The rollers 39 remain stationary in the ramp surfaces 41 being formed in the ramp body 36 at one side and in the bearing ring 38 at the other side (see FIG. 4). The ramp surfaces 41 are continuously shaped in a circular way as ramps merging into each other so that the rollers 39 can override into the next ramp surface 41 as needed, respectively.

Since the thrust piece 53 is axially guided in the housing of the brake caliper 1 exclusively by means of the guidance pin 61 and thus cannot be rotated, a rotation of the adjustment spindle 52 results in an axial displacement of the thrust piece 53. Thereby the clearance will be compensated.

If during brake actuation the brake lining 8 comes into contact with the brake disc, a closed distribution/flow of forces with a corresponding counter force in relation to the introduced force is created. With increasing force in axial direction there exists a point at which the torque between the thrust piece 53 and the adjustment spindle 52 due to the friction in the thread 54 will be larger than the torque introduced into the torque clutch for the purpose of torque limitation by means of the coil spring 63. Accordingly, the adjustment spindle 52 and the gear wheel 37 and thus the ramp body 36 do rest.

However, at this moment the hollow shaft 47, the internal holding sleeve 46 and the bearing ring 38 continue to rotate which results in that the rollers 39 cannot remain stationary anymore but do move further in the ramp surfaces 41 of the ramp body 36 and do pile against the ramp surfaces 41.

Since the ramp body 36 is supported against the force-transmitting element 30 by means of a low friction-bearing element 42 the piling of the rollers 39 causes that the bearing ring 38 moves away from the ramp body 36 in direction towards the brake disc and thereby compresses the coil spring 63. This compression takes place during the entire brake actuation stroke and virtually forms the resilient part of the later reset movement.

In case the actuator does not further introduce a force into the brake actuation mechanism 17, the return movement supported by the reset device 21 will be initiated.

At the beginning there still exists a contact between the brake lining 8 and the brake disc at which still substantial forces do act. Then the single components gear wheel 37, ramp body 36 and bearing ring 38 with the rollers 39 there in between and the hollow shaft 47 do rotate in the opposite rotational direction till they return to their original angular position at the beginning of the braking process. Thus, these components reverse their movements during the braking stroke in correspondence with the resilient part as previously mentioned.

If during the performed braking stroke no abrasion occurs at the brake lining 8 and thus no wear exists at the brake lining 8, a force transmitting contact between the brake linings 8 and the brake disc terminates exactly at that time at which the components gear wheel 37, ramp body 36, bearing ring 38 and hollow shaft 47 do return again to their angular starting position. These components then do rest in their position till the pin-like element 51 does abut against the opposite abutment surface of the connecting groove or recess 51A of the lever 23, in which the pin-like element is guided, during the pivoting movement of the lever 23 in the opposite pivoting direction. Then the hollow shaft 47 actively will be further rotated in the opposite rotational direction by means of the rearwardly directed pivoting movement of the lever 23, whereas the internal holding sleeve 46 and the bearing ring 38 remain stationary due to the sprag spring 49. In this phase the sprag spring 49 then overrides by such an angle which corresponds to the adjustment of the clearance during the braking stroke.

The recess 51A of the lever 23 is a bit larger than the thickness of the pin-like element 51 thereby forming a tolerance. This tolerance corresponds to the clearance between the brake lining 8 and the brake disc which will be never adjusted for the purpose of functional safety.

If, however, after the braking stroke wear is present at the brake lining 8, for example after a strong emergency braking, force transmitting contact between the brake linings 8 and the brake disc is abolished before the components gear wheel 37, ramp body 36 and bearing ring 38 with the rollers 39 there in between could have returned to their angular starting position.

At this time the force acting in axial direction onto the torque clutch by means of the coil spring 63 effects that the gear wheel 37 and thus the adjustment spindle 52 are set into rotation, whereby the wear can be compensated. The further course of the movement of the single components is then identical as for the case without wear as described above.

The adjustment during the release of the brake and the return of the thrust piece 53, respectively, and the reverse pivoting movement of the lever 23 is also a consequence of the small internal friction and the small hysteresis of the roller-ramp-mechanism 35 resulting therefrom. For that reason preferably a roller-ramp-mechanism is utilized as a torque clutch according to the invention since the latter enables the exact determination of a torque for a torque limitation with small manufacturing costs.

Figure 8:
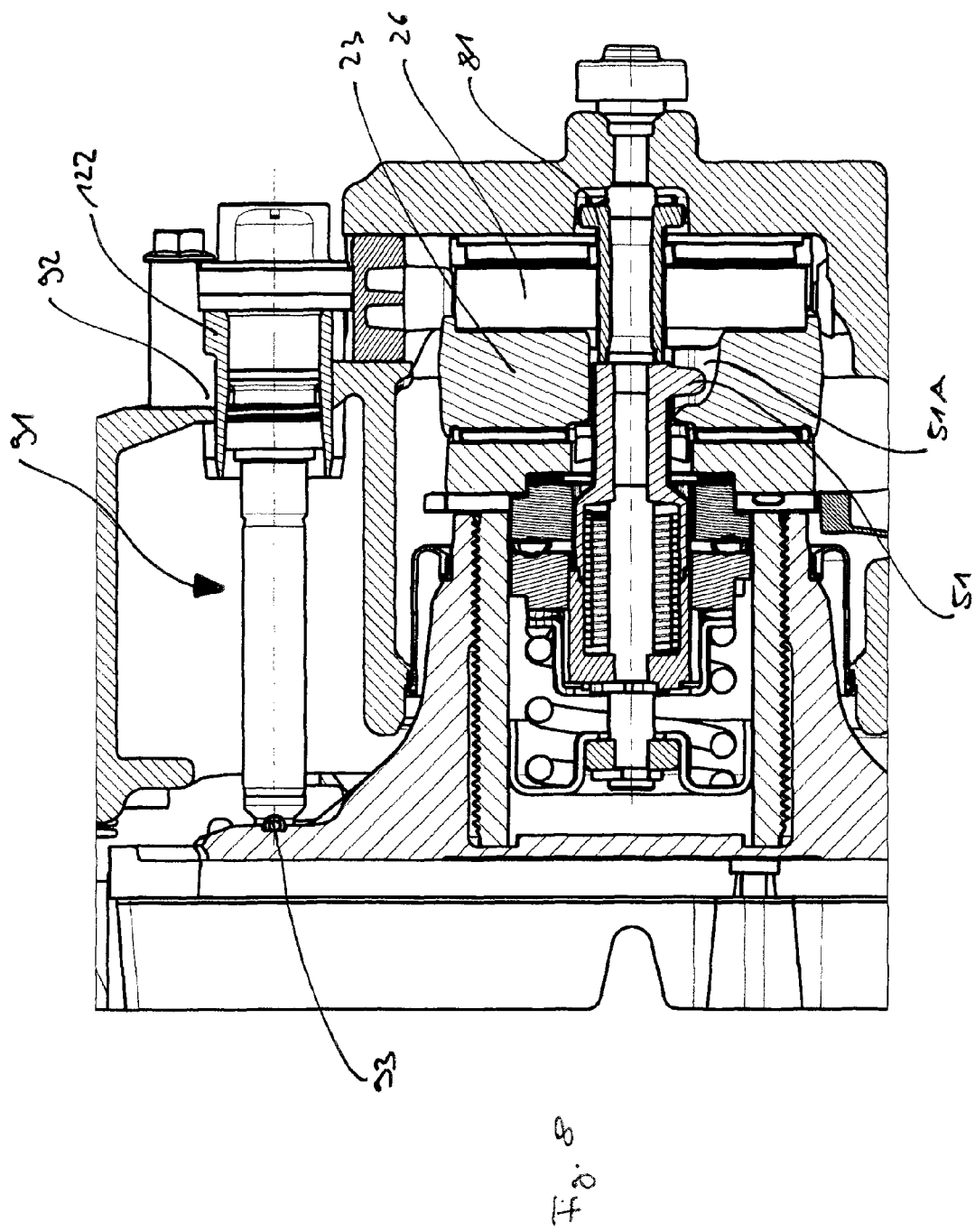
FIG. 8 is an arrangement of a sensor unit for detecting a lining wear according to the invention.
Figure 9:
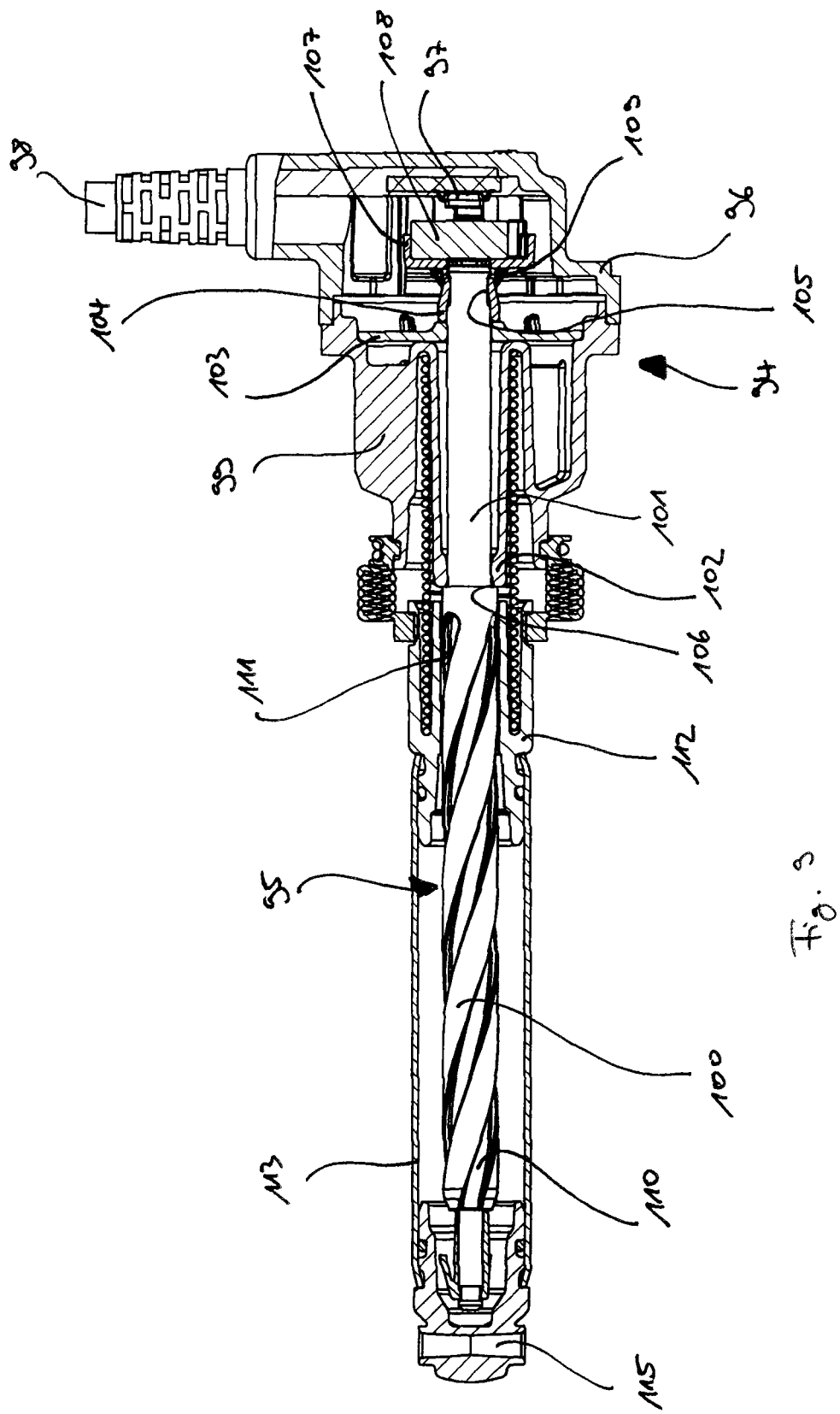
FIG. 9 schematically shows the sensor unit in cross-section in its starting position.
Figure 10:
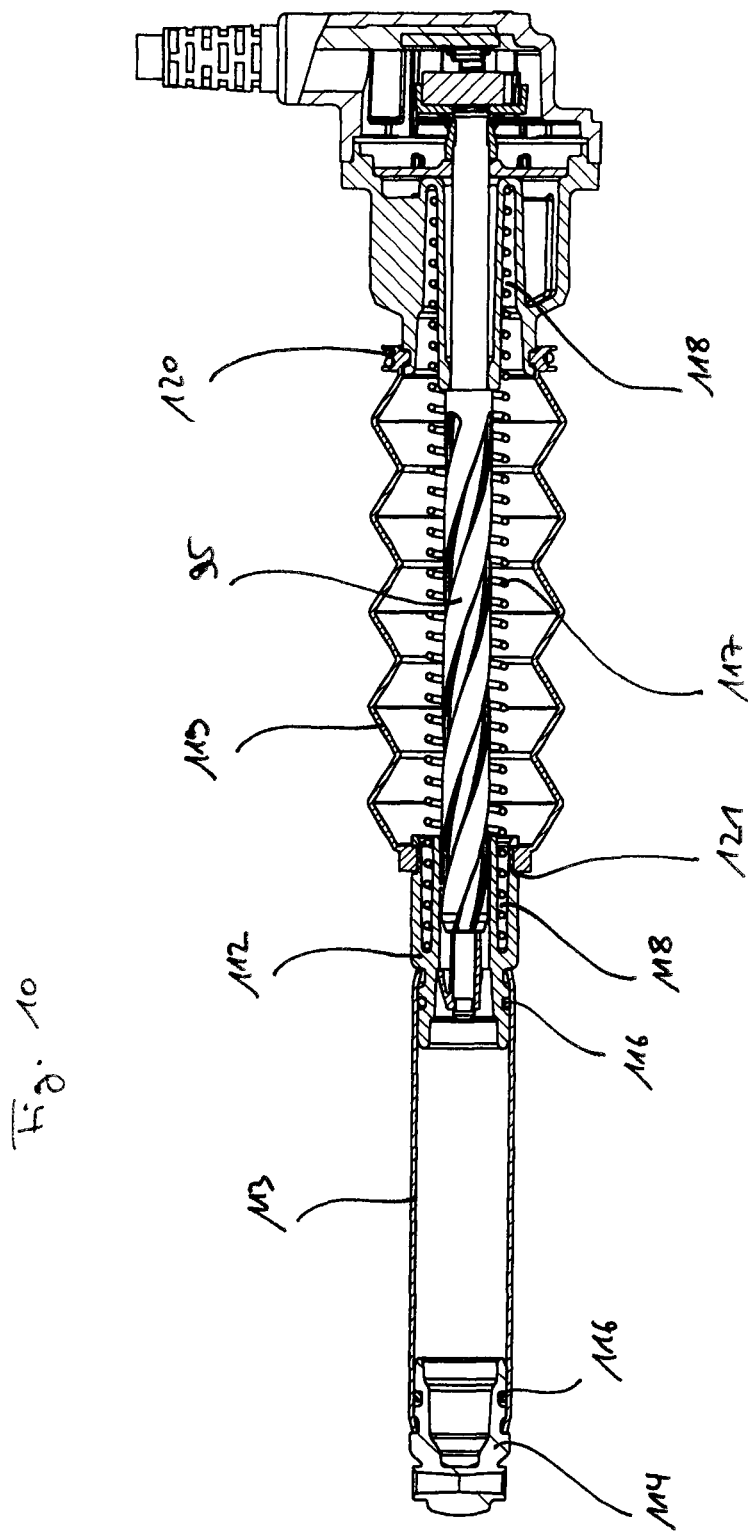
FIG. 10 schematically shows the sensor unit in cross-section in an extended state.

FIGS. 8 to 10 show a sensor unit 91 for the determination of the lining wear in a specific arrangement according to the invention.

The sensor unit 91 will be inserted rearwardly into the housing of the brake caliper 1 through a receiving or fixture opening 92. The sensor unit 91 at its end facing the brake disc comprises means 93 for connection with the thrust piece 53, for example, a releasable clamping element or plug connection by means of a pin which cooperates with a corresponding element at the thrust piece 53.

According to the invention the sensor unit 91 is configured such that the relative movement of the thrust piece 53 in relation to the brake caliper 1 during the adjustment of the clearance can be detected.

The sensor unit 91 freely passes the interior of the brake caliper 1 in parallel to the axis of the rod 22.

In this connection the sensor unit 91 on the one hand is guided in the receiving opening 92 in the brake caliper 1 and on the other hand at the opposite side by means of the connection with the thrust piece 53 via the pin element 93 so that substantially a strict axial movability without tilting is realized.

As can be recognized from FIGS. 9 and 10 the sensor unit 91 comprises a stationary, rear housing 94 in which a threaded element 95, for example a spindle, is rotatably, but non-displaceably guided.

The housing 94 comprises a rear housing fixture 96, which in the mounted state of the sensor unit 91 is located outside of the housing of the brake caliper 1. This housing fixture 96 includes a sensor element 97 which preferably is made of at least one Hall-element. From the housing fixture 96 a connection 98 leads to a boardside computer network in order to transmit the actual wear condition.

The housing fixture 96 is placed on a housing support part 99 and fixedly but releasably connected therewith. The sensor unit 91 is fixed in the receiving opening 92 of the brake caliper 1 by means of the housing support part 99.

On the one hand, the housing support part 99 serves for the rotatable support of the spindle 95 and on the other hand for the connection of a transmitting element being displaceable relative thereto.

The spindle 95 which comprises a threaded section 100 and a cylindrical section 101 is rotatably guided in a guidance 102 of the housing support part 99. Hereby the spindle 95 is axially fixed in the direction facing away from the thrust piece 53 by means of a shoulder-like transition 106 between the housing section 100 and the cylindrical section 101, which transition 106 abuts against the guidance 102. In the axial direction directed towards the thrust piece 53 the spindle is axially positioned and fixed by means of a bearing sleeve 104. The bearing sleeve 104 in this connection abuts against a cover 103 which is inserted into the housing support part 99. Furthermore, the bearing sleeve 104 engages with a chamfer 105 of the cylindrical section 101 by means of tongues 109.

At the rear end of the bearing sleeve 104 a guiding cup 107 is provided in which at least one magnet 108 being non-rotatably connected to the end of the spindle 95 is fixed.

The magnet 108 rotates by a distance over the Hall-element of the sensor element 97. Accordingly, it concerns a touchless detection of the wear.

The threaded section 100 of the spindle 95 comprises a thread 110 having a very large pitch. The thread 110 engages a displacement block 112 by means of a pin element 111.

The displacement block 112 is moveable relative to the housing support part 99 and comprises a sleeve 113 into which the threaded section 100 of the spindle 95 does extend. The sleeve 113 ends in an end housing 114 which comprises an opening 115 for the pin element 93 for connection with the thrust piece 53. The sleeve 113 together with the sealing rings 116 serves for the protection of the threaded section 100 against dirt.

As can be seen from FIGS. 9 and 10, the transmitting unit comprising the end housing 114, the sleeve 113 and the displacement block 112 is displaced together with the thrust piece 53 in axial direction towards the brake disc or away from it. This displacement movement, from which the adjustment movement for the wear can be derived, will be transformed into a rotational movement of the spindle by means of the coupling with the pin element 111, in which, in turn, the rotation of the spindle 95 resulting therefrom will be detected by the Hall-element 97 via the rotating magnets 108 and then computed in a calculation circuit, accordingly.

According to the invention the pitch of the thread 110 is selected such that the entire possible length of the axial displacement path of the sleeve 113 and of the displacement block 112, respectively, results at most in one complete rotation of the spindle 95. This means that the displacement path of the adjustment, which is possible at most till the brake linings 8 and the brake disc will be completely worn, never exceeds a 360°-rotation of the spindle 95. By that the measuring accuracy can be increased by a more simple circuit.

In order to always ensure a perfect contact of the end housing 114 with the thrust piece 53 and in order to always maintain a faultless guidance of the pin element 111 in the thread 110 during the displacement movements of the displacement block 112, the latter is biased with respect to the housing support part 99, which bias is provided by a spring 117 between these both elements, which spring 117 is coupled in corresponding recesses 118 in these elements. The spindle 95 and the spring 117 are protected against the interior of the brake caliper 1 by means of a bellows 119 which at one side is fixed onto the housing support part 99 by means of a clamp ring 120 and at the other side in a groove 121 in the displacement block 112 without becoming loose.

For a better guidance and alignment of the sensor unit 91 so that the latter is always in parallel to the rod 22 without tilting, the housing support part 99 is received by a mounting sleeve 122 which is inserted into the fixture opening 92 of the brake caliper 1.

It becomes apparent that the sensor unit 91 according to the invention can be mounted as a whole into the brake caliper 1 and removed therefrom without the need to handle other components of the brake actuation mechanism 17 or without the need that parts thereof have to be removed for the purpose of better accessibility. In order to exchange a defect sensor element 97 it is also not required to exchange the entire sensor unit, it is already sufficient to remove the housing fixture 96 from the housing support part 99.

The principle to measure the wear by means of the linear adjustment movement performed by the thrust piece 53 allows the utilization of a relatively simple and thus functionally safe calculation circuit. Moreover, since no further components of the brake actuation mechanism 17 do influence the movement to be detected, the accuracy of the measurement can be increased.

FIGS. 11 to 22 do show the single method steps of the assembly method according to the invention.

The assembly of the brake actuation mechanism can be performed by using different modules or units.

Figure 11:
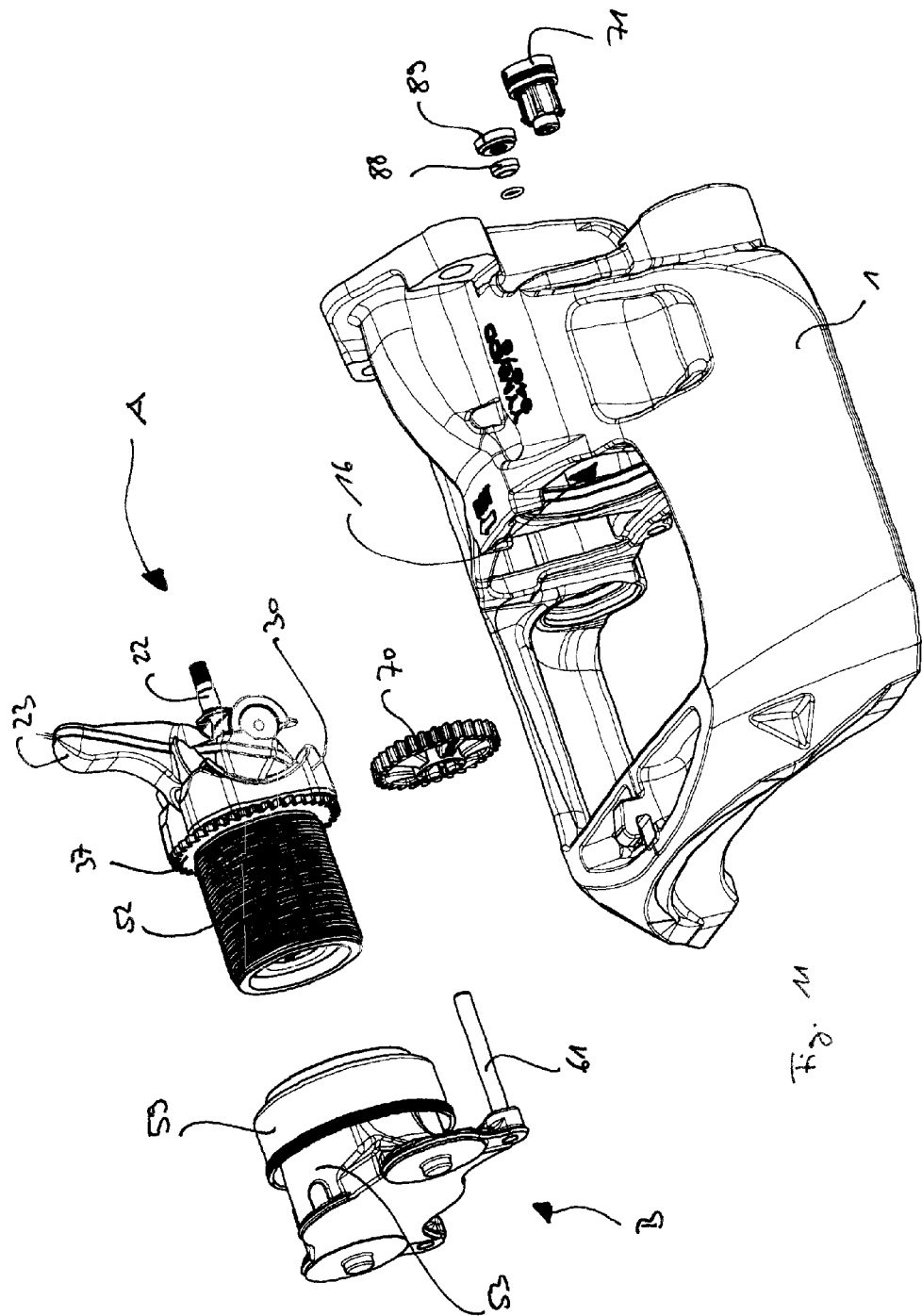
FIG. 11 schematically shows all components for a method of manufacturing a disc brake according to a first embodiment of the invention.

As an example, FIG. 11 shows the single modules for the method according to the invention in a first embodiment in explosive view.

The brake actuation mechanism 17 is separated into two modules A and B.

The first module A comprises
the entire amplification mechanism 18 with the lever 23, the eccentric rollers 26, the bearing cups 27 and the force-transmitting element 30;

the entire adjustment device with the torque clutch, the adjustment spindle 52 and the gear wheel 37; and the internal reset device 21, not shown in FIG. 11.

All components are pre-mounted and axially fixed on the rod 22 so that the module A can be transported as one unit.

The second module B comprises the thrust piece 53 with the sealing sleeve 59 and with the guiding pin 61.

As further components the adjustment pinion 70 and its axis body 71 can be recognized, as well as the support and fixation means 88, 89 for the rod 22.

Figure 12:
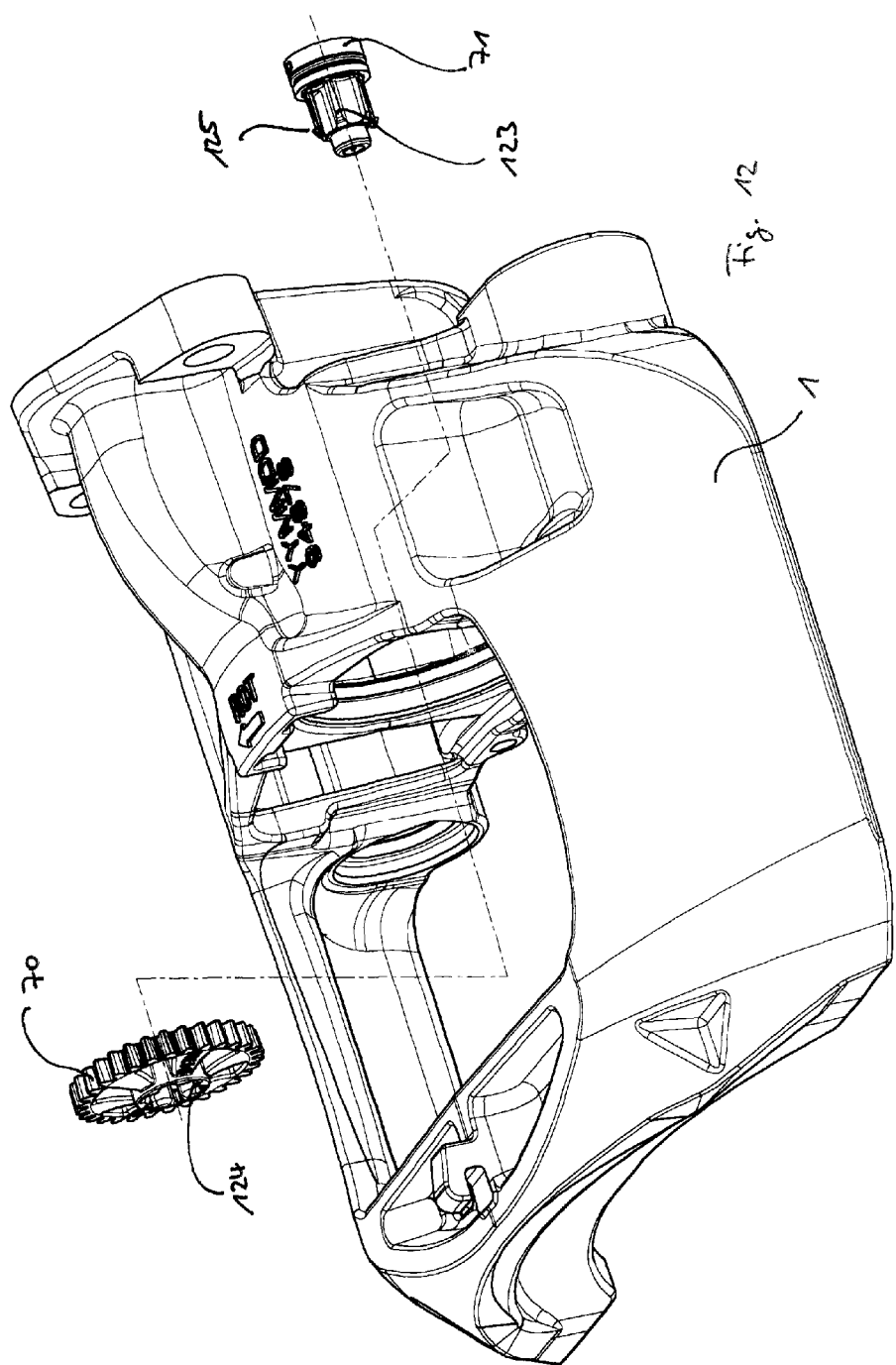
FIG. 12 schematically shows a first step of this method.
Figure 13:
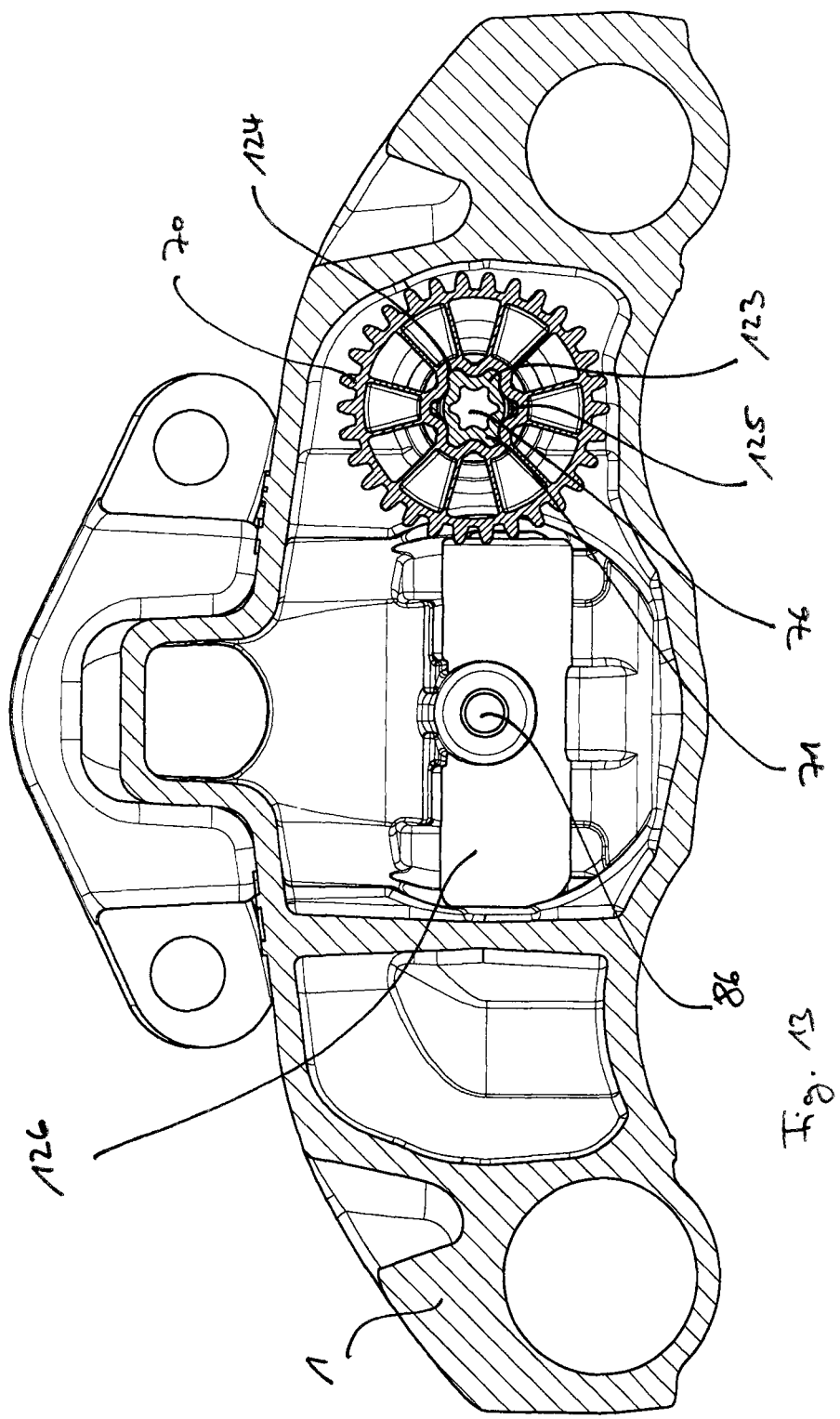
FIG. 13 schematically shows an axial cross-section view of the brake caliper after the first step of the method.
Figure 14:
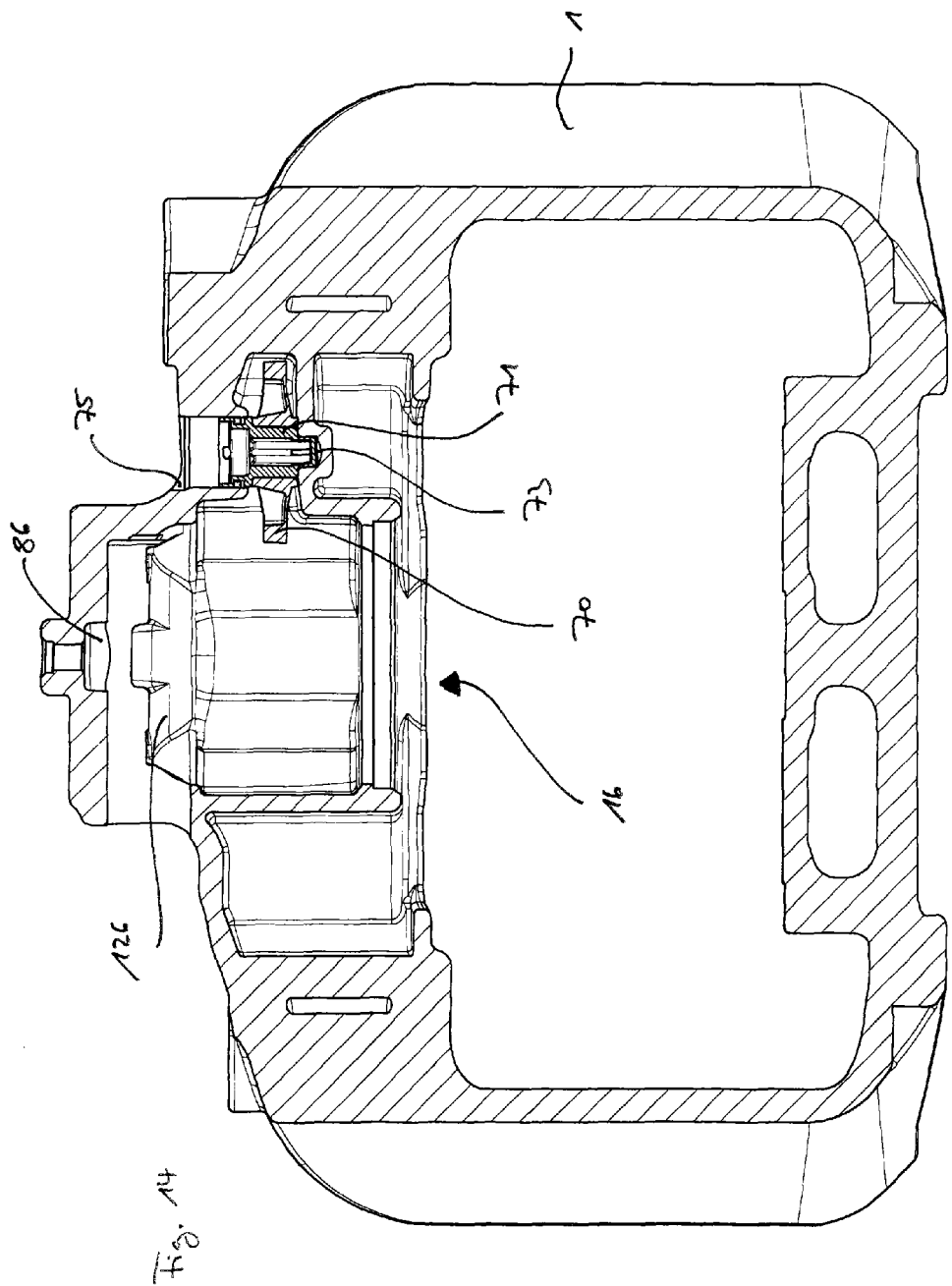
FIG. 14 schematically shows a cross-sectional view from above of the brake caliper after the first step of the method.

A first assembly step can be seen in FIGS. 12 to 14.

The adjustment pinion 70 will be inserted through the opening 16 facing the brake disc into the interior of the housing of the brake caliper 1, whereas at the same time the axis body 71 will be inserted through the opening 75 from the rear.

The axis body 71 comprises wedges 123 which do engage with corresponding inner grooves 124 of the adjustment pinion 70. Furthermore, the axis body 71 comprises two latches 125 which form a releasable clamping connection between the adjustment pinion 70 and the axis body 71.

The adjustment pinion 70 is rotatably guided in that the plug-like axis body 71 will be inserted into the bearing blind bore 71 in the housing of the brake caliper 1.

Figure 15:
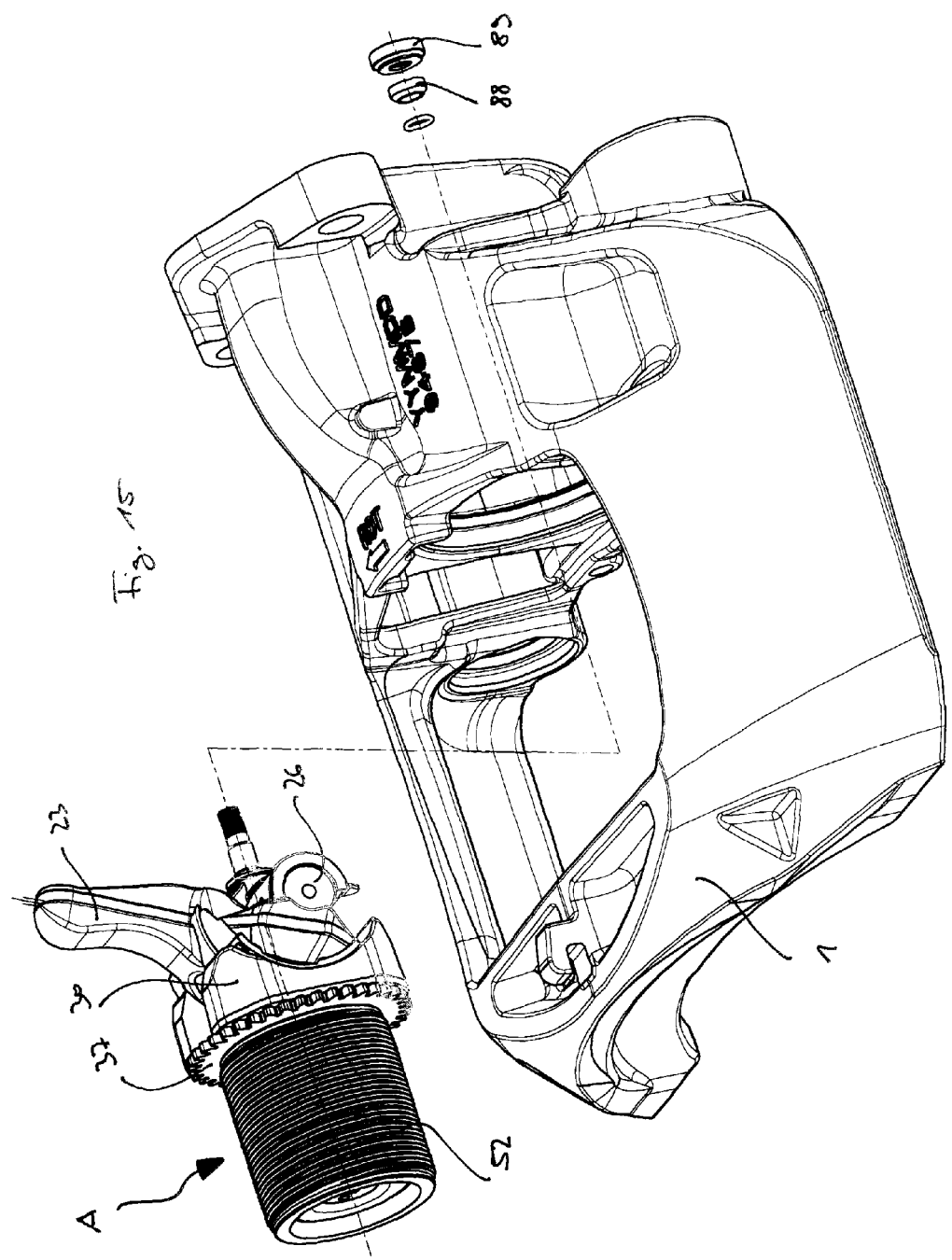
FIG. 15 schematically shows a second step of the method.

According to a next step, as this is shown in FIG. 15, the module A will be completely inserted into the interior of the housing of the brake caliper 1 through the opening 16 facing the brake disc in such a way that on the one hand the rod 22 passes with its free rear end the opening 86 and on the other hand the gear wheel 37 comes into engagement with the adjustment pinion 70. In this connection the bearing cups 27 of the eccentric rollers 26 do abut against corresponding bearing surfaces 126 (see FIG. 13).

Thereby the opening 16 is dimensioned with just a magnitude that module A with the lever 23 can be inserted by simple tilting without problems.

Figure 16:
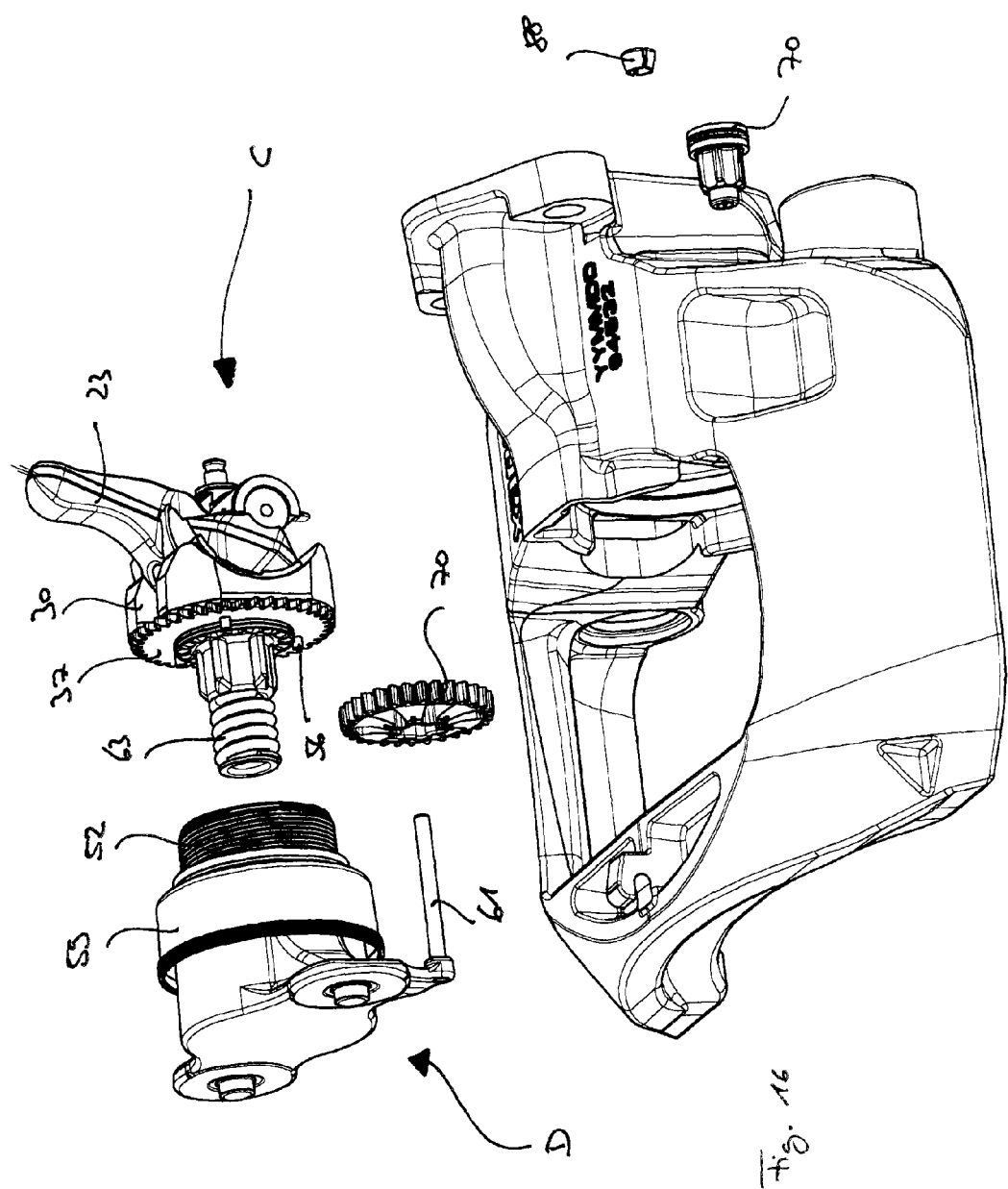
FIG. 16 schematically shows all components for a method for manufacturing a disc brake according to a second embodiment of the invention.

FIG. 16 shows in explosive view an alternative embodiment of the assembly method in which the separation of the modules in their components differs from the embodiment as described above.

In this connection, the adjustment spindle 52 is already screwed onto the thrust piece 53.

Accordingly, the first module C comprises the entire amplification mechanism 18 with the lever 23, the eccentric rollers 26, the bearing cups 27 and the force-transmitting element 30;

partly the adjustment device with the torque clutch and the gear wheel 37; and the entire reset device 21.

Module D comprises the thrust piece 53 with the sealing sleeve 59 and with the guiding pin 61, in which the adjustment spindle 52 is already screwed into the thrust piece 53.

The assembly of module C is similar to that of module A.

Figure 17:
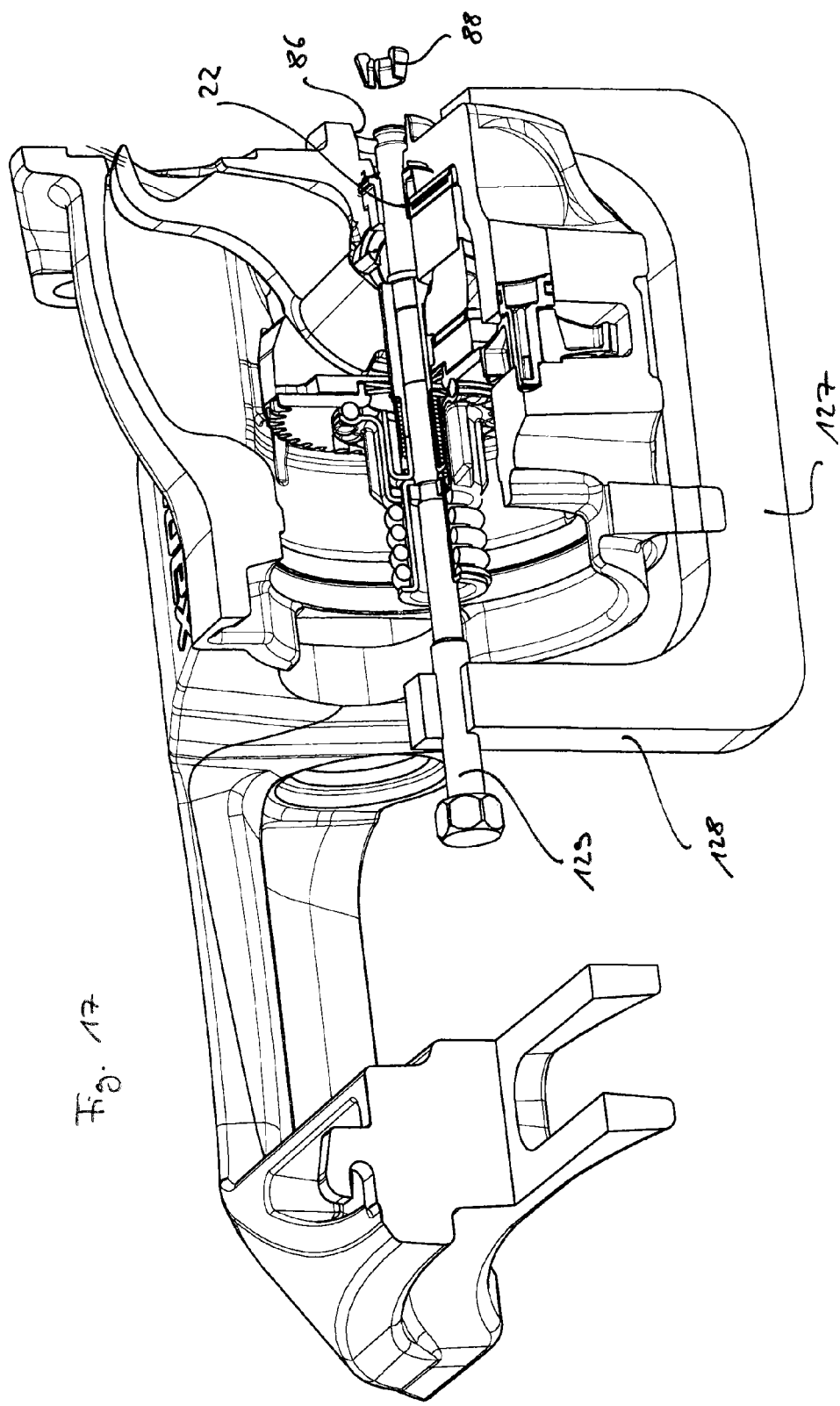
FIG. 17 schematically shows a third step of the method according to the second embodiment.

Schematically, FIG. 17 shows the fixation of module C in the housing of the brake caliper 1. The procedure for this embodiment is identical to the one for module A since in this method step it is all about as how to fix the rod 22 in the brake caliper 1.

A clamp-like support tool 127 is configured and dimensioned such that it could overlap the brake caliper 1 at its outside and underneath of it. An adjustment screw 129 is rotatably supported in one arm 128 of the support tool 127.

The support tool 127 will be attached to the brake caliper 1 in such a way that the adjustment screw 129 can attach the end of the rod 22 facing the brake disc.

By rotating the adjustment screw 129 the rod 22 will be displaced to the rear, i.e. away from the position of the brake disc, and the opposite free end of the rod 22 will be moved through the opening 86 to the outside. At this point the bearing and fixation means can be attached to the rod 22.

With respect to the axial interlocking of the rod 22 in the rear housing section of the brake caliper 1 two alternatives are suggested.

The embodiment shown in FIGS. 2 to 5, 7 to 8, 11, 15 and 19 to 22, respectively, utilizes a wedge ring 88 which is inserted into the opening 86 and which will finally become further fixed by means of the fixation nut 89 without coming loose.

In the embodiment as shown in FIGS. 16 to 18 at least two cup- or partly circular-shaped cotter halves 88 will be attached to the rod 22, then the adjustment screw 129 will be rotated in opposite direction so that the rod 22 can move backwards and by that the cotter halves 88 will come in contact with the opening 86, which opens conically to the outside, and by that interlock the rod 22.

Due to the rod 22 being mounted in the housing of the brake caliper 1 the coil spring 63 is under a defined pretension which serves for the torque limit of the torque clutch.

FIG. 18 schematically shows a further assembly step of the method according to the invention.

Now the module D will be inserted into the opening 16, so that the guiding pin 61 will be aligned with its corresponding opening 62. The guiding pin 61 then slides into the opening 62 so that the module D in its entirety cannot be rotated anymore.

The angular position of the adjustment spindle 52 is selected in this connection such that also the blind bores 57 in the face surface of the adjustment spindle 52 are in alignment with the rivets 56 of the gear wheel 37.

Again by attaching the support tool 127 at the brake caliper 1 and by subsequently rotating the adjustment screw 129, the module D will be moved in a direction towards the module C till both modules do enter into a fixed connection by means of the rivets 56. The force applied by the adjustment screw 129 is sufficient to form a press-fit at the connecting elements between the gear wheel 37 and the adjustment spindle 52.

After that the support tool 127 with the adjustment screw 129 will be removed.

According to the first embodiment referring to module A, which has already integrated the adjustment spindle 52, subsequent assembly of module B is as follows.

The module B will be attached at the face surface of the adjustment spindle 52 facing the brake disc through the opening 16, namely such that again the guiding pin 61 is in alignment with the opening 62. At the opposite side the adjustment pinion 70 will be rotated by means of a corresponding screwing tool which engages with the socket 76 of the axis body 71, and thus the adjustment spindle 52 will be rotated via the coupling with the gear wheel 37. In this way the adjustment spindle 52 can be screwed into the thrust piece 53 and due to the rotational locking by the guiding pin 61 the adjustment spindle 52 "pulls" the module B into the interior of the housing of the brake caliper 1, respectively. This assembly step is shown as an example in FIG. 19.

However, before the module B can be screwed onto the adjustment spindle 52, the pretensioning of the reset device 21, which is defined for the desired torque limit has to be finally adjusted.

In an alternative embodiment (see FIG. 7) with a threaded nut 67 at the end of the rod 22 facing the brake disc the latter comprises recesses 130 for receiving a corresponding tool, for example a torque wrench by which the threaded nut 67 can be rotated so that the same moves away from the brake disc and thereby compresses the coil spring 63 thereby creating the desired pretension. This is exemplarily shown in FIG. 20.

The thrust piece 53 will be screwed onto the adjustment spindle 52 only to such an extent that the free end 131 of the sealing sleeve 59 still protrudes from the opening 16.

Figure 21A:
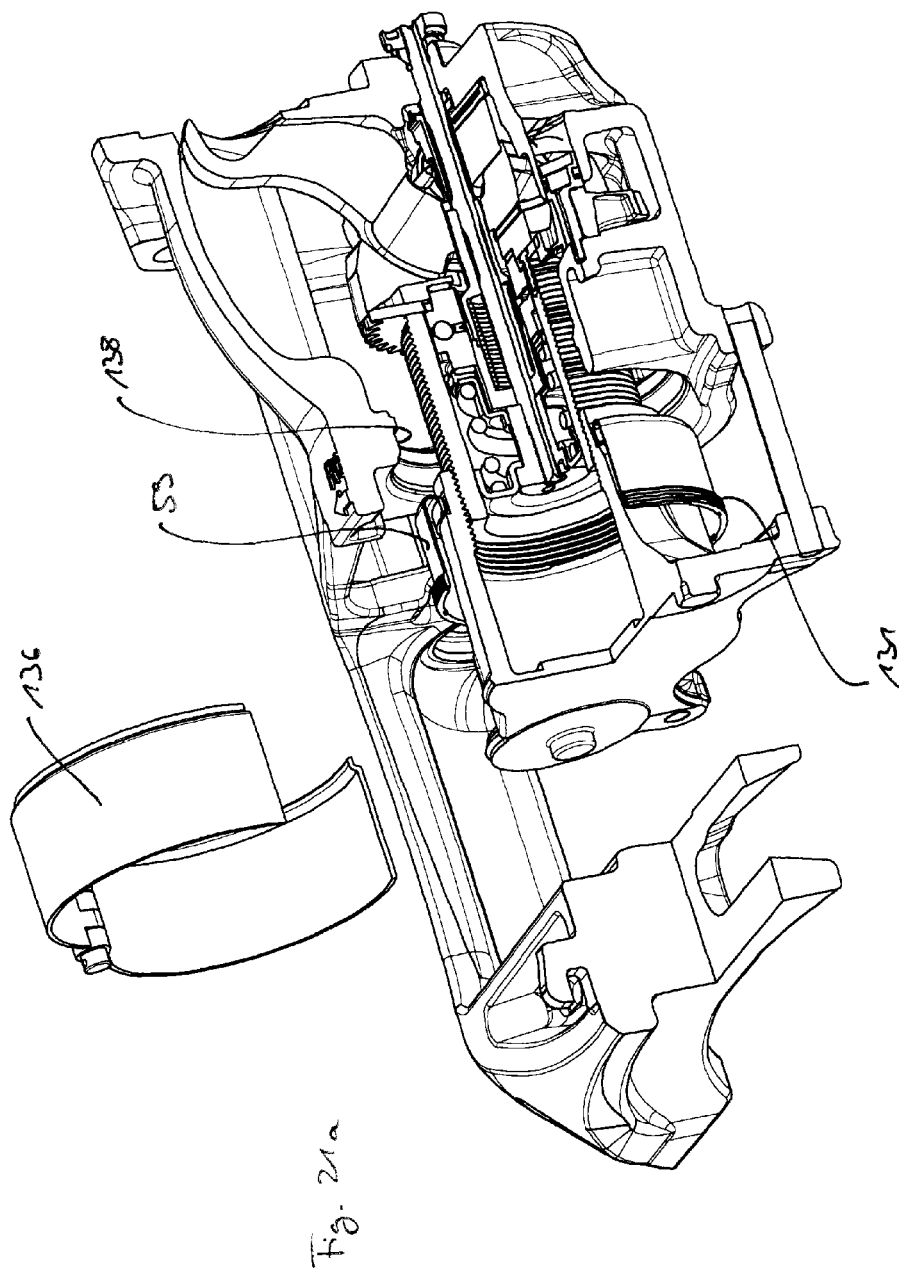
FIG. 21 *a, b* schematically shows a sixth step for the method both according to the first and to the second embodiment.
Figure 22:
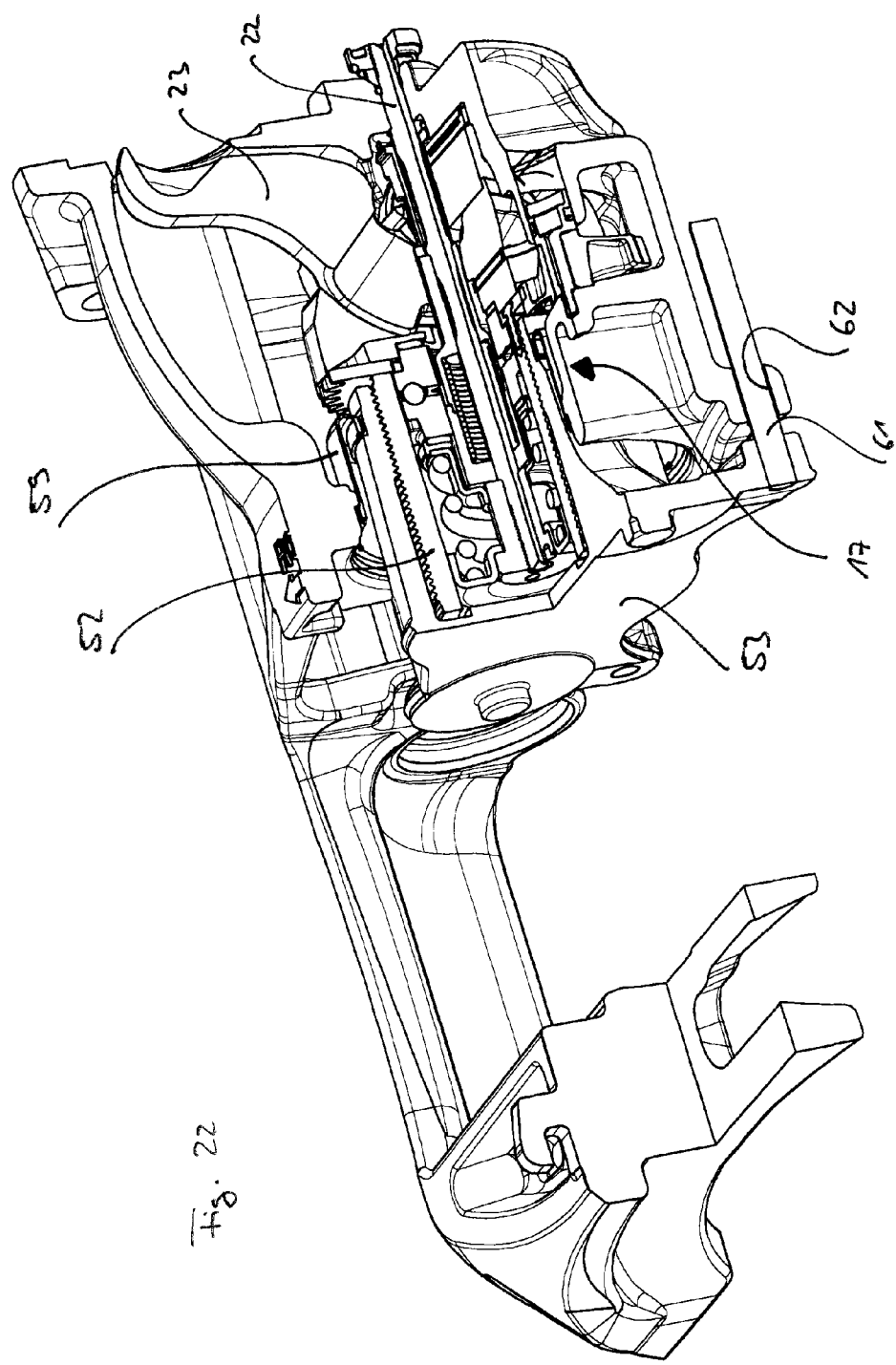
FIG. 22 shows the mounted brake actuation mechanism after termination of the method steps.

As FIGS. 21a and 21b show now the sealing sleeve 59 will be mounted. For that a further clamp-like support tool 132 will be attached in such a way that it overlaps the brake caliper 1 again at its outside and underneath of it.

The arm 133 facing the brake disc is formed as a half ring 134 which overlaps the thrust piece 53 and which opens upwardly, which half ring 134 comprises a groove 135.

A separate push sleeve tool 136, being formed of two halves which can be pivoted towards each other, is inserted into the groove 135. At the face surface opposite of the groove 135 the push sleeve tool 136 attaches to the free end 131 of the sealing sleeve 59.

By means of a further adjustment screw 137, which will be arranged at the side of the support tool 132 being opposite to the half ring 134, which adjustment screw 137 at the outside abuts against the rear housing of the brake caliper 1, the entire support tool 132 with the push sleeve tool 136 can be moved in direction towards the housing of the brake caliper 1, in Figs. to the right side, by rotating till the free end 131 of the sealing sleeve 59 with the metal insert 60 does abut against the corresponding abutment surface 138 inside the brake caliper 1. There it will either be interlocked or can be fixed by gluing.

After that, also these auxiliary assembly means will be removed. Finally the adjustment pinion 70 and thereby the adjustment spindle 52 via the gear wheel 37 is rotated by a tool-supported rotation of the axis body 71 so long till the thrust piece 53 has come to its starting position in relation to the adjustment spindle 52 and till the entire brake actuation mechanism 17 is in its functional starting position. This is exemplarily shown in FIG. 22.

What is claimed is:

1. A method for manufacturing a disc brake, the disc brake including a brake caliper, which overlaps at least one brake disc, and a brake actuation mechanism, which has:
   an amplification mechanism for introducing a clamping force,
   an adjustment device for compensation of lining wear, the adjustment device comprising a torque clutch,
   a thrust element for transmitting the clamping force onto the brake disc, and
   a reset device, in which the amplification mechanism, the adjustment device, the thrust element and the reset device are mounted in functional cooperation in the brake caliper by means of a rod, which is non-moveably supported in axial direction in the housing of the brake caliper, characterized in that the torque clutch is formed as a roller-ramp-mechanism which acts between the amplification mechanism and the thrust element, in which the rollers of the roller-ramp-mechanism are moveably arranged co-axially with respect to the rod;
the method comprising the steps of:
   inserting of an adjustment pinion into the housing of the brake caliper and fixing on a shaft in the housing,
   inserting of a first unit comprising the amplification mechanism, the adjustment device having a gear wheel and the reset device and the rod keeping these elements together into the housing of the brake caliper, in which the rod will be inserted through a rear opening of the housing of the brake caliper so that the gear wheel comes into threaded engagement with the adjustment pinion,
   attaching of a support tool with an adjustment tool, in which the adjustment tool is rotatably guided in the support tool, at the brake caliper such that the adjustment tool attaches at the end of the rod facing the brake disc,
   rotating of the adjustment tool so that an opposite free end of the rod will be displaced through the rear opening in the housing of the brake caliper to the outside,
   attaching of at least one support and fixation means at the free end of the rod,
   rotating of the adjustment tool in reverse direction so that the rod is displaced in opposite direction and interlocks the at least one support and fixation means in the rear opening in the housing of the brake caliper and thereby the rod will be non-rotatably fixed in the housing in axial direction, and
   removing of the support tool with the adjustment tool, in which after fixation of the rod the reset device is biased by a defined pretension.

2. The method according to claim 1, wherein the gear wheel is connected with an adjustment spindle, further comprising the step of:
   inserting of a thrust piece with a sealing sleeve attached thereto with a free end into the housing of the brake caliper such that the adjustment spindle and the thrust piece come into threaded engagement.

3. The method according to claim 1, further comprising the steps of:
   inserting of a further unit, which comprises an adjustment spindle and a thrust piece being in threaded engagement with the adjustment spindle and a sealing sleeve being attached to the thrust piece, with a free end into the housing of the brake caliper,
   attaching of the support tool with the adjustment tool at the brake caliper such that the adjustment tool attaches to the thrust piece,
   rotating of the adjustment tool till the adjustment spindle is in a fixed connection with the gear wheel by means of corresponding connecting means, and
   removing of the support tool with the adjustment tool.

4. The method according to claim 2, wherein the thrust piece comprises a guiding pin, further comprising the steps of:
   aligning of the guiding pin with a corresponding guiding opening in the housing of the brake caliper, and
   rotating of the adjustment pinion such that the thrust piece is moved onto the adjustment spindle by sliding insertion of the guiding pin into the guiding opening.

5. The method according to claim 4, further comprising the steps of:
   attaching of a further support tool at the brake caliper for axial guiding a push sleeve tool surrounding the thrust piece so that the push sleeve tool comes into contact with the sealing sleeve,
   displacing of the push sleeve tool such that the sealing sleeve is displaced into the housing of the brake caliper till the free end of the sealing sleeve abuts against a corresponding radial support surface in the housing of the brake caliper, and
   removing of the further support tool with the push sleeve tool.

6. The method according to claim 5, further comprising the step of:

rotating of the adjustment pinion till the thrust piece comes into its operating position on the adjustment spindle.

7. A method for manufacturing a disc brake, the disc brake including a brake caliper, which overlaps at least one brake disc, and a brake actuation mechanism, which has:
   an amplification mechanism for introducing a clamping force,
   an adjustment device for compensation of lining wear, the adjustment device comprising a torque clutch,
   a thrust element for transmitting the clamping force onto the brake disc, and
   a reset device, in which the amplification mechanism, the adjustment device, the thrust element and the reset device are mounted in functional cooperation in the brake caliper by means of a rod, which is non-moveably supported in axial direction in the housing of the brake caliper, characterized in that the amplification mechanism, the reset device, the thrust element and the reset device on the one hand and the rod on the other hand are configured and dimensioned in axial direction such that in the assembled state of the brake actuation mechanism the reset device is biased thereby forming a defined torque limit for the torque clutch;
the method comprising the steps of:
   inserting of an adjustment pinion into the housing of the brake caliper and fixing on a shaft in the housing,
   inserting of a first unit comprising the amplification mechanism, the adjustment device having a gear wheel and the reset device and the rod keeping these elements together into the housing of the brake caliper, in which the rod will be inserted through a rear opening of the housing of the brake caliper so that the gear wheel comes into threaded engagement with the adjustment pinion,
   attaching of a support tool with an adjustment tool, in which the adjustment tool is rotatably guided in the support tool, at the brake caliper such that the adjustment tool attaches at the end of the rod facing the brake disc,
   rotating of the adjustment tool so that an opposite free end of the rod will be displaced through the rear opening in the housing of the brake caliper to the outside,
   attaching of at least one support and fixation means at the free end of the rod,
   rotating of the adjustment tool in reverse direction so that the rod is displaced in opposite direction and interlocks the at least one support and fixation means in the rear opening in the housing of the brake caliper and thereby the rod will be non-rotatably fixed in the housing in axial direction, and
   removing of the support tool with the adjustment tool, in which after fixation of the rod the reset device is biased by a defined pretension.

8. The method according to claim 7, wherein the gear wheel is connected with an adjustment spindle, further comprising the step of:
   inserting of a thrust piece with a sealing sleeve attached thereto with a free end into the housing of the brake caliper such that the adjustment spindle and the thrust piece come into threaded engagement.

9. The method according to claim 7, further comprising the steps of:
   inserting of a further unit, which comprises an adjustment spindle and a thrust piece being in threaded engagement with the adjustment spindle and a sealing sleeve being attached to the thrust piece, with a free end into the housing of the brake caliper,
   attaching of the support tool with the adjustment tool at the brake caliper such that the adjustment tool attaches to the thrust piece,
   rotating of the adjustment tool till the adjustment spindle is in a fixed connection with the gear wheel by means of corresponding connecting means, and
   removing of the support tool with the adjustment tool.

10. The method according to claim 8, wherein the thrust piece comprises a guiding pin, further comprising the steps of:
   aligning of the guiding pin with a corresponding guiding opening in the housing of the brake caliper, and
   rotating of the adjustment pinion such that the thrust piece is moved onto the adjustment spindle by sliding insertion of the guiding pin into the guiding opening.

11. The method according to claim 10, further comprising the steps of:
   attaching of a further support tool at the brake caliper for axial guiding a push sleeve tool surrounding the thrust piece so that the push sleeve tool comes into contact with the sealing sleeve,
   displacing of the push sleeve tool such that the sealing sleeve is displaced into the housing of the brake caliper till the free end of the sealing sleeve abuts against a corresponding radial support surface in the housing of the brake caliper, and
   removing of the further support tool with the push sleeve tool.

12. The method according to claim 11, further comprising the step of:
   rotating of the adjustment pinion till the thrust piece comes into its operating position on the adjustment spindle.

13. A method for manufacturing a disc brake, the disc brake including a brake caliper, which overlaps at least one brake disc, and a brake actuation mechanism, which has:
   an amplification mechanism for introducing a clamping force,
   an adjustment device for compensation of lining wear, the adjustment device comprising a torque clutch,
   a thrust element for transmitting the clamping force onto the brake disc, and
   a reset device, in which the amplification mechanism, the adjustment device, the thrust element and the reset device are mounted in functional cooperation in the brake caliper by means of a rod which is non-moveably supported in axial direction in the housing of the brake caliper, characterized in that the reset device applies a spring force in axial direction onto the torque clutch;
the method comprising the steps of:
   inserting of an adjustment pinion into the housing of the brake caliper and fixing on a shaft in the housing,
   inserting of a first unit comprising the amplification mechanism, the adjustment device having a gear wheel and the reset device and the rod keeping these elements together into the housing of the brake caliper, in which the rod will be inserted through a rear opening of the housing of the brake caliper so that the gear wheel comes into threaded engagement with the adjustment pinion,
   attaching of a support tool with an adjustment tool, in which the adjustment tool is rotatably guided in the support tool, at the brake caliper such that the adjustment tool attaches at the end of the rod facing the brake disc, rotating of the adjustment tool so that an opposite free end of the rod will be displaced through the rear opening in the housing of the brake caliper to the outside, attaching of at least one support and fixation means at the free end of the rod, rotating of the adjustment tool in reverse direction so that the rod is displaced in opposite direction and interlocks the support and fixation means in the rear opening in the housing of the brake caliper and thereby the rod will be non-rotatably fixed in the housing in axial direction, and removing of the support tool with the adjustment tool, in which after fixation of the rod the reset device is biased by a defined pretension.

14. The method according to claim 13, wherein the gear wheel is connected with an adjustment spindle, further comprising the step of:

inserting of a thrust piece with a sealing sleeve attached thereto with a free end into the housing of the brake caliper such that the adjustment spindle and the thrust piece come into threaded engagement.

15. The method according to claim 13, further comprising the steps of:

inserting of a further unit, which comprises an adjustment spindle and a thrust piece being in threaded engagement with the adjustment spindle and a sealing sleeve being attached to the thrust piece, with a free end into the housing of the brake caliper, attaching of the support tool with the adjustment tool at the brake caliper such that the adjustment tool attaches to the thrust piece, rotating of the adjustment tool till the adjustment spindle is in a fixed connection with the gear wheel by means of corresponding connecting means, and removing of the support tool with the adjustment tool.

16. The method according to claim 14, wherein the thrust piece comprises a guiding pin, further comprising the steps of:

aligning of the guiding pin with a corresponding guiding opening in the housing of the brake caliper, and rotating of the adjustment pinion such that the thrust piece is moved onto the adjustment spindle by sliding insertion of the guiding pin into the guiding opening.

17. The method according to claim 16, further comprising the steps of:

attaching of a further support tool at the brake caliper for axial guiding a push sleeve tool surrounding the thrust piece so that the push sleeve tool comes into contact with the sealing sleeve, displacing of the push sleeve tool such that the sealing sleeve is displaced into the housing of the brake caliper till the free end of the sealing sleeve abuts against a corresponding radial support surface in the housing of the brake caliper, and removing of the further support tool with the push sleeve tool.

18. The method according to claim 17, further comprising the step of:

rotating of the adjustment pinion till the thrust piece comes into its operating position on the adjustment spindle.

19. A method for manufacturing a disc brake, the disc brake including a brake caliper, which overlaps at least one brake disc, and a brake actuation mechanism, which has:

an amplification mechanism for introducing a clamping force, an adjustment device for compensation of lining wear, the adjustment device comprising a torque clutch, a thrust element for transmitting the clamping force onto the brake disc, and a reset device, in which the amplification mechanism, the adjustment device, the thrust element and the reset device are mounted in functional cooperation in the brake caliper by means of a rod which is non-moveably supported in axial direction in the housing of the brake caliper, characterized in that the reset device is supported in axial direction relative to the reset device at one side and relative to the amplification mechanism at the other side by means of a low friction-bearing element, respectively;

the method comprising the steps of:

inserting of an adjustment pinion into the housing of the brake caliper and fixing on a shaft in the housing, inserting of a first unit comprising the amplification mechanism, the adjustment device having a gear wheel and the reset device and the rod keeping these elements together into the housing of the brake caliper, in which the rod will be inserted through a rear opening of the housing of the brake caliper so that the gear wheel comes into threaded engagement with the adjustment pinion, attaching of a support tool with an adjustment tool, in which the adjustment tool is rotatably guided in the support tool, at the brake caliper such that the adjustment tool attaches at the end of the rod facing the brake disc, rotating of the adjustment tool so that an opposite free end of the rod will be displaced through the rear opening in the housing of the brake caliper to the outside, attaching of at least one support and fixation means at the free end of the rod, rotating of the adjustment tool in reverse direction so that the rod is displaced in opposite direction and interlocks the support and fixation means in the rear opening in the housing of the brake caliper and thereby the rod will be non-rotatably fixed in the housing in axial direction, and removing of the support tool with the adjustment tool, in which after fixation of the rod the reset device is biased by a defined pretension.

20. The method according to claim 19, wherein the gear wheel is connected with an adjustment spindle, further comprising the step of:

inserting of a thrust piece with a sealing sleeve attached thereto with a free end into the housing of the brake caliper such that the adjustment spindle and the thrust piece come into threaded engagement.

21. The method according to claim 19, further comprising the steps of:

inserting of a further unit, which comprises an adjustment spindle and a thrust piece being in threaded engagement with the adjustment spindle and a sealing sleeve being attached to the thrust piece, with a free end into the housing of the brake caliper, attaching of the support tool with the adjustment tool at the brake caliper such that the adjustment tool attaches to the thrust piece, rotating of the adjustment tool till the adjustment spindle is in a fixed connection with the gear wheel by means of corresponding connecting means, and removing of the support tool with the adjustment tool.

22. The method according to claim 20, wherein the thrust piece comprises a guiding pin, further comprising the steps of:

aligning of the guiding pin with a corresponding guiding opening in the housing of the brake caliper, and rotating of the adjustment pinion such that the thrust piece is moved onto the adjustment spindle by sliding insertion of the guiding pin into the guiding opening.

23. The method according to claim 22, further comprising the steps of:

attaching of a further support tool at the brake caliper for axial guiding a push sleeve tool surrounding the thrust piece so that the push sleeve tool comes into contact with the sealing sleeve, displacing of the push sleeve tool such that the sealing sleeve is displaced into the housing of the brake caliper till the free end of the sealing sleeve abuts against a corresponding radial support surface in the housing of the brake caliper, and removing of the further support tool with the push sleeve tool.

24. The method according to claim 23, further comprising the step of:

rotating of the adjustment pinion till the thrust piece comes into its operating position on the adjustment spindle.

25. The method according to claim 7, wherein the torque clutch is formed as a roller-ramp-mechanism which acts between the amplification mechanism and the thrust element, in which rollers of the roller-ramp-mechanism are moveably arranged co-axially with respect to the rod.

26. The method according to claim 1, wherein the roller-ramp-mechanism is arranged outside of the flow of forces of the clamping force.

27. The method according to claim 26, wherein the roller-ramp-mechanism interacts with at least one low friction-bearing element.

28. The method according to claim 1, in which the amplification mechanism comprises a lever which is supported against at least one eccentric support being transverse to the rod, in which at least one force-transmitting element is arranged between the lever and the thrust element by means of which the clamping force from the lever is introduced into the thrust element.

29. The method according to claim 28, wherein the thrust element comprises an adjustment spindle, which is in threaded engagement with a thrust piece which cooperates with a brake lining, in which the thrust piece is axially non-rotatably guided in the housing of the brake caliper.

30. The method according to claim 29, wherein the adjustment spindle is formed as a hollow spindle, in which the reset device and the roller-ramp-mechanism are arranged inside the hollow spindle.

31. The method according to claim 29, wherein the adjustment spindle at its end facing away from the brake disc is non-rotatably connected with the gear wheel which cooperates with both the at least one force-transmitting element and the roller-ramp-mechanism.

32. The method according to claim 26, wherein the roller-ramp-mechanism comprises a ramp body, which is non-rotatably connected with the gear wheel, and a bearing ring, and in which the rollers are freely moveably supported between the ramp body and the bearing ring.

33. The method according to claim 32, wherein the reset device is supported at the end of the rod facing the brake disc at an abutment cup and thereby applies a spring force onto the bearing ring.

34. The method according to claim 33, wherein an external holding sleeve is arranged between the reset device and the bearing ring.

35. The method according to claim 34, wherein a low friction-bearing element is arranged between the bearing ring and the external holding sleeve and between the ramp body and the force-transmitting element, respectively.

36. The method according to claim 34, wherein the ramp body, the rollers, the bearing ring and the external holding sleeve enclose an internal holding sleeve and a hollow shaft, in which the internal holding sleeve and the hollow shaft are rotatably arranged on the rod.

37. The method according to claim 36, wherein the internal holding sleeve and the hollow shaft are connected in axial direction by means of a sprag spring thereby enclosing the sprag spring co-axially on the rod, in which the hollow shaft is arranged to be set into rotation by the lever and the internal holding sleeve is non-rotatably connected with the bearing ring.

38. The method according to claim 32, wherein the gear wheel is in engagement with the adjustment pinion which is rotatably supported in the housing of the brake caliper and can be set into rotation from the outside of the housing.

39. The method according to claim 30, wherein the thrust piece comprises at least one guiding pin which is slideably guided in an opening in the housing of the brake caliper in parallel to the rod and outside of the flow of forces of the clamping force.

40. The method according to claim 1, wherein the rod keeps together the amplification mechanism and the adjustment device and the thrust element and the reset device as a self-supported assembly unit.

41. The method according to claim 30, wherein a sensor device for the lining wear cooperates with the thrust piece, in which the sensor device can be inserted as a unit into the housing of the brake caliper from the rear and which freely traverses the housing of the brake caliper up to the thrust piece in parallel to the rod.

42. The method according to claim 41, wherein the sensor device comprises a transmitting element for transmitting the linear movement of the thrust piece into a rotational movement and a sensor element for detecting the rotational movement, in which the transmitting element comprises a linear element attaching at the thrust piece, which is displaceably arranged relative to a threaded element which is rotatably supported, in which the linear element will be set into rotation upon displacement of the threaded element and in which the threaded element with its end facing away from brake disc cooperates with the sensor element in a touchless manner.

43. The method according to claim 42, wherein the sensor element is a Hall-sensor and cooperates with at least one magnet being arranged at the end of the threaded element facing away from the brake disc.

44. The method according to claim 42, wherein the thread pitch of the threaded element is selected such that at most one entire rotation is performed for the entire possible linear displacement of the linear element.

45. The method according to claim 42, wherein the linear element is biased in axial direction.

* * * * *